(12) United States Patent
Sezer

(10) Patent No.: US 10,972,739 B2
(45) Date of Patent: *Apr. 6, 2021

(54) LOW-COMPLEXITY TWO-DIMENSIONAL (2D) SEPARABLE TRANSFORM DESIGN WITH TRANSPOSE BUFFER MANAGEMENT

(71) Applicant: Texas Instruments Incorporated, Dallas, TX (US)

(72) Inventor: Osman Gokhan Sezer, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/560,391

(22) Filed: Sep. 4, 2019

(65) Prior Publication Data
US 2019/0394469 A1  Dec. 26, 2019

Related U.S. Application Data

(63) Continuation of application No. 16/005,463, filed on Jun. 11, 2018, now Pat. No. 10,448,023, which is a
(Continued)

(51) Int. Cl.
*H04N 19/152* (2014.01)
*H04N 19/44* (2014.01)
(Continued)

(52) U.S. Cl.
CPC ......... *H04N 19/152* (2014.11); *H04N 19/122* (2014.11); *H04N 19/14* (2014.11); *H04N 19/29* (2014.11); *H04N 19/426* (2014.11); *H04N 19/44* (2014.11); *H04N 19/60* (2014.11); *H04N 19/91* (2014.11); *H04N 19/176* (2014.11); *H04N 19/184* (2014.11)

(58) Field of Classification Search
CPC ........ H04N 19/44; H04N 19/60; H04N 19/91; H04N 19/426
See application file for complete search history.

(56) References Cited

U.S. PATENT DOCUMENTS 7,142,720 B1   11/2006  Fukuda et al.
2001/0026642 A1   10/2001  Kang et al.
(Continued)

OTHER PUBLICATIONS

Gary J. Sullivan et al, "Overview of the High Efficiency Video Coding (HEVC) Standard", IEEE Transactions on Circuits and Systems for Video Technology, vol. 22, No. 12, Dec. 2012, pp. 1649-1668.
(Continued)

*Primary Examiner* — Nam D Pham
(74) *Attorney, Agent, or Firm* — Ebby Abraham; Charles A. Brill; Frank D. Cimino

(57) ABSTRACT

Methods are provided for reducing the size of a transpose buffer used for computation of a two-dimensional (2D) separable transform. Scaling factors and clip bit widths determined for a particular transpose buffer size and the expected transform sizes are used to reduce the size of the intermediate results of applying the 2D separable transform. The reduced bit widths of the intermediate results may vary across the intermediate results. In some embodiments, the scaling factors and associated clip bit widths may be adapted during encoding.

17 Claims, 12 Drawing Sheets

(PRIOR ART)

Related U.S. Application Data continuation of application No. 15/357,515, filed on Nov. 21, 2016, now Pat. No. 9,998,740, which is a continuation of application No. 14/806,027, filed on Jul. 22, 2015, now Pat. No. 9,503,737, which is a continuation of application No. 13/846,809, filed on Mar. 18, 2013, now Pat. No. 9,131,210.

(60) Provisional application No. 61/611,674, filed on Mar. 16, 2012.

(51) Int. Cl.
    *H04N 19/91*   (2014.01)
    *H04N 19/60*   (2014.01)
    *H04N 19/426*  (2014.01)
    *H04N 19/14*   (2014.01)
    *H04N 19/122*  (2014.01)
    *H04N 19/29*   (2014.01)
    *H04N 19/176*  (2014.01)
    *H04N 19/184*  (2014.01)

(56) References Cited

U.S. PATENT DOCUMENTS

| | | |
|---|---|---|
| 2007/0299897 A1 | 12/2007 | Reznik |
| 2009/0112958 A1 | 4/2009 | Cham et al. |
| 2013/0034150 A1 | 2/2013 | Sadafale |

OTHER PUBLICATIONS

Jong-Sik Park et al, "2-D Large Inverse Transform (16×16, 32×32) for HEVC (High Efficiency Video Coding)", Journal of Semiconductor Technology and Science, vol. 12, No. 2, Jun. 2012, pp. 203-211.

Rajan Joshi et al, "Efficient Large Size Transforms for High-Performance Video Coding", Applications of Digital Image Processing XXXIII, Edited by Andrew G. Tescher, San Diego, CA, Proceedings of the SPIE, vol. 7798, Aug. 2010 (7 pages).

Benjamin Bross et al, "WD4: Working Draft 4 of High-Efficiency Video Coding", JCTVC-F803_d6, Joint Collaborative Team on Video Coding (JCT-VC) of ITU-T SG16 WP3 and ISO/IEC JTC1/SC29/WG11, Jul. 14-22, 2011, Torino, Italy (229 pages).

Thomas Wiegand et al, "WD3: Working Draft 3 of High-Efficiency Video Coding", JCTVC-E603, Joint Collaborative Team on Video Coding (JCT-VC) of ITU-T SG16 WP3 and ISO/IEC JTC1/SC29/WG11, Mar. 16-23, 2011, Geneva, Switzerland (215 pages).

Benjamin Bross et al, "WD5: Working Draft 5 of High-Efficiency Video Coding", JCTVC-G1103_d9, Joint Collaborative Team on Video Coding (JCT-VC) of ITU-T SG16 WP3 and ISO/IEC JTC1/SC29/WG11, Nov. 21-30, 2011, Geneva, Switzerland (237 pages).

Benjamin Bross et al, "High Efficiency Video Coding (HEVC) Text Specification Draft 7", JCTVC-I1003_d1, Joint Collaborative Team on Video Coding (JCT-VC) of ITU-T SG16 WP3 and ISO/IEC JTC1/SC29/WG11, Apr. 27-May 7, 2012, Geneva, Switzerland (272 pages).

Benjamin Bross et al, "High Efficiency Video Coding (HEVC) Text Specification Draft 6", JCTVC-H1003, Joint Collaborative Team on Video Coding (JCT-VC) of ITU-T SG16 WP3 and ISO/IEC JTC1/SC29/WG11, Nov. 21-30, 2011, Geneva, Switzerland (259 pages).

Benjamin Bross et al, "High Efficiency Video Coding (HEVC) Text Specification Draft 8", JCTVC-J1003_d7, Joint Collaborative Team on Video Coding (JCT-VC) of ITU-T SG16 WP3 and ISO/IEC JTC1/SC29/WG11, Jul. 11-20, 2012, Stockholm, Sweden (260 pages).

Benjamin Bross et al, "High Efficiency Video Coding (HEVC) Text Specification Draft 9", JCTVC-K1003_v13, Joint Collaborative Team on Video Coding (JCT-VC) of ITU-T SG16 WP3 and ISO/IEC JTC1/SC29/WG11, Oct. 10-19, 2012, Shanghai, China (317 pages).

"TMS320DM6467 Digital Media System-on-Chip", SPRS403G, Texas Instruments Incorporated, Dec. 2007, revised Oct. 2010 (355 pages).

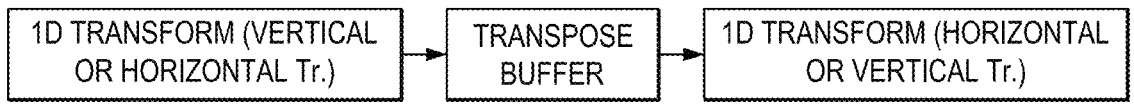
FIG. 1
(PRIOR ART)
FIG. 2
(PRIOR ART)
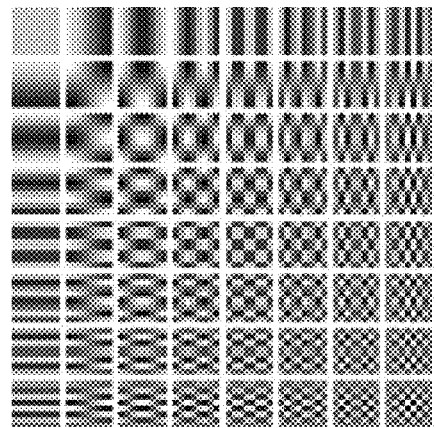
FIG. 3
(PRIOR ART)

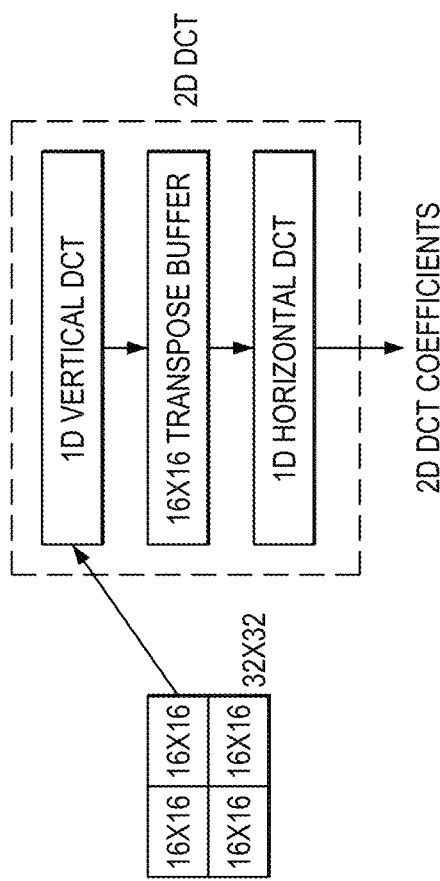

LOW-COMPLEXITY TWO-DIMENSIONAL (2D) SEPARABLE TRANSFORM DESIGN WITH TRANSPOSE BUFFER MANAGEMENT

CROSS-REFERENCE TO RELATED APPLICATIONS

This application is a continuation of U.S. patent application Ser. No. 16/005,463, filed Jun. 11, 2018, which is a continuation of U.S. patent application Ser. No. 15/357,515 (now U.S. Pat. No. 9,998,740), filed Nov. 21, 2016, which is a continuation of U.S. patent application Ser. No. 14/806,027 (now U.S. Pat. No. 9,503,737), filed Jul. 22, 2015, which is a continuation of U.S. patent application Ser. No. 13/846,809 (now U.S. Pat. No. 9,131,210), filed Mar. 18, 2013, which claims the benefit of U.S. Provisional Patent Application Ser. No. 61/611,674, filed Mar. 16, 2012, all of which are incorporated herein by reference in their entirety.

BACKGROUND OF THE INVENTION

Field of the Invention

Embodiments of the present invention generally relate to low-complexity two-dimensional (2D) separable transform design with transpose buffer management for video coding.

Description of the Related Art

The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). Similar to previous video coding standards such as H.264/AVC, HEVC is based on a hybrid coding scheme using block-based prediction and transform coding. First, the input signal is split into rectangular blocks that are predicted from the previously decoded data by either motion compensated (inter) prediction or intra prediction. The resulting prediction error is coded by applying block transforms based on an integer approximation of the discrete cosine transform, which is followed by quantization and coding of the transform coefficients.

Similar to prior video standards, HEVC specifies the use of adaptive transform sizes. However, HEVC as currently defined also allows the use of much larger transforms, e.g., 16×16 and 32×32, than in prior video coding standards. Video resolutions continue to increase, which will likely lead to even larger transforms in future versions of HEVC and its successors. Large transform sizes increase the complexity of hardware and software implementations.

SUMMARY

Embodiments of the present invention relate to methods, apparatus, and computer readable media for computing separable 2D transforms with variable bit width intermediate results. In one aspect, a method for decoding an encoded video bit stream is provided that includes entropy decoding a block of transform coefficients from the video bit stream, applying a first 1D inverse transform of a 2D separable inverse transform to the block of transform coefficients, reducing a bit width of each intermediate result of applying the first 1D inverse transform, wherein the reduced bit width of a first intermediate result and the reduced bit width of a second intermediate result are different, storing the reduced bit width intermediate results in a transpose buffer, and applying a second 1D inverse transform of the 2D separable inverse transform to the reduced bit width intermediate results to recover a block of residual values.

In one aspect, a method for encoding a video sequence to generate an encoded video bit stream is provided that includes applying a first 1D transform of a 2D separable transform to a block of residual values, reducing a bit width of each intermediate result of applying the first 1D transform, wherein the reduced bit width of a first intermediate result and the reduced bit width of a second intermediate result are different, storing the reduced bit width intermediate results in a transpose buffer, applying a second 1D transform of the 2D separable transform to the reduced bit width intermediate results to generate a block of transform coefficients, and entropy encoding the block of transform coefficients into the video bit stream.

In one aspect, a method for encoding a video sequence to generate an encoded video bit stream is provided that includes computing a rate distortion cost for a coding block of a picture of the video sequence, wherein computing the rate distortion cost includes applying a first 1D transform of a 2D separable transform to a first block of residual values, reducing a bit width of each intermediate result of applying the first 1D transform, wherein the reduced bit width of a first intermediate result and the reduced bit width of a second intermediate result are different, storing the reduced bit width intermediate results in a first transpose buffer, applying a second 1D transform of the 2D separable transform to the reduced bit width intermediate results to generate a first block of transform coefficients, and computing the rate distortion cost using the first block of transform coefficients, using the rate distortion cost to select a prediction mode for the coding block, generating a second block of residual values for the coding block according to the prediction mode, computing a second block of transform coefficients for the second block of residual values, and entropy encoding the second block of transform coefficients into the encoded video bit stream.

BRIEF DESCRIPTION OF THE DRAWINGS

Particular embodiments will now be described, by way of example only, and with reference to the accompanying drawings:

FIG. 1 illustrates implementation of a two-dimensional (2D) separable transform;

FIG. 2 is an example of an 8-point one-dimensional (1D) discrete cosine transform (DCT);

FIG. 3 illustrates the effective transform resulting from application of the transform of FIG. 2 to columns and then rows;

FIG. 4 is flow diagram of a method;

FIG. 5 is an example illustrating coefficient sizes and scaling of a 4×4 forward discrete cosine transform (DCT) as defined in HEVC;

DETAILED DESCRIPTION OF EMBODIMENTS OF THE INVENTION

Figure 6:
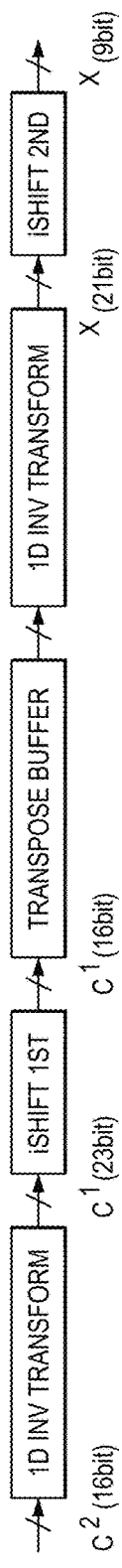
FIG. 6 is an example illustrating coefficient sizes and scaling of a 4×4 inverse DCT as defined in HEVC.

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments are described herein in reference to HEVC. One of ordinary skill in the art will understand that embodiments of the invention are not limited to HEVC. Particularly, one of ordinary skill in the art will understand that embodiments of the transform design may be used for other 2D separable transform implementations.

In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be, for example, 4×4, 8×8, 16×16, and 32×32. The sizes of the transforms units and prediction units for a CU are determined by the video encoder during prediction based on minimization of rate/distortion costs.

Various versions of HEVC are described in the following documents, which are incorporated by reference herein: T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, Mar. 16-23, 2011 ("WD3"), B. Bross, et al., "WD4: Working Draft 4 of High-Efficiency Video Coding," JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding," JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), B. Bross, et al., "High Efficiency Video Coding (HEVC) Text Specification Draft 6," JCTVC-H1003_dK, Joint Collaborative Team on Video Coding (JCT-VC) of ITU-T SG16 WP3 and ISO/IEC JTC1/SC29/WG1, San Jose, Calif., Feb. 1-10, 2012, ("HEVC Draft 6"), B. Bross, et al., "High Efficiency Video Coding (HEVC) Text Specification Draft 7," JCTVC-I1003_d1, Joint Collaborative Team on Video Coding (JCT-VC) of ITU-T SG16 WP3 and ISO/IEC JTC1/SC29/WG1, Geneva, CH, April 17-May 7, 2012 ("HEVC Draft 7"), B. Bross, et al., "High Efficiency Video Coding (HEVC) Text Specification Draft 8," JCTVC-J1003_d7, Joint Collaborative Team on Video Coding (JCT-VC) of ITU-T SG16 WP3 and ISO/IEC JTC1/SC29/WG1, Stockholm, SE, Jul. 11-20, 2012 ("HEVC Draft 8"), and B. Bross, et al., "High Efficiency Video Coding (HEVC) Text Specification Draft 9," JCTVC-K1003_v13, Joint Collaborative Team on Video Coding (JCT-VC) of ITU-T SG16 WP3 and ISO/IEC JTC1/SC29/WG1, Shanghai, CN, Oct. 10-19, 2012 ("HEVC Draft 9").

FIG. 1 illustrates the computation of a two-dimensional (2D) separable transform. As this figures shows, to compute a 2D transform of the 2D input data, a horizontal (or vertical) one-dimensional (1D) transform is applied to rows (or columns) of the input data and the result is stored in an intermediate buffer, also referred to as a transpose buffer. A second 1D transform is then applied to columns (or rows) of the data in the transpose buffer to complete the transformation. Hardware implementation of large 2D separable transforms such as those used in video coding is costly due to the number of gates needed to store intermediate values between first and second 1D transforms. To speed computation, the transpose buffer can be implemented as registers but the number of gates needed to store a bit increases significantly compared to using standard memory elements.

In the current transform designs in the HEVC test model software, each intermediate coefficient generated after the first 1D transform for both forward and inverse transforms requires 16 bits. In general, the number of gates needed to implement a transpose buffer is found by multiplying ten with the number of bits required to represent intermediate values. Thus, for a 32×32 transform implementation with a 16-bit intermediate coefficient size, the needed transpose buffer size is 32×32×16~16 k bits. This translates into approximately 160 k gates in hardware.

Embodiments of the invention provide a low-complexity 2D separable transform architecture for hardware and software implementations. Further, embodiments of the invention offer hardware or software designers flexibility in determining the best performing transform architecture depending on the hardware/software budget. For a given transpose buffer budget and/or bus width between a processor and memory, techniques described herein may be used to change the bit width of the intermediate results generated from application of the first 1D transform for both forward and inverse transforms with minimal impact on the representation performance of the 2D transform. Embodiments may be implemented in an encoder without requiring that a decoder receiving the encoded bit streams use the same implementation. Similarly, embodiments maybe implemented in a decoder without requiring that an encoder providing encoded bits streams use the same implementation. In addition to allowing bus width or transpose buffer size reduction, the arithmetic units used for transform computation may be simpler. Further, in some embodiments, a designer can reduce hardware cycles by changing the bit width of internal and external parameters. In some embodiments described herein, a discrete cosine transform (DCT) is used as an example of a 2D separable transform. DCT is a popular transform in video and image compression applications due to ease of implementation and good compression efficiency. One of ordinary skill in the art, having benefit of this disclosure, will understand embodiments for other separable 2D transforms. FIG. 2 is an example of an 8-point 1D DCT. Using the matrix in FIG. 2, the N-point 1D DCT transform may be performed as follows. Let x be 1D input data. Then $$c[i] = \sum_{k=0}^{N-1} x[k]d_i[k] \qquad (1)$$

where c[i] is the coefficient of the i-th transform, $d_i$. For 2D data X, the columns (or rows) of the input data are first transformed as follows $$C_{1D} = X^T D \qquad (2)$$

where $C_{1D}$ is the coefficient matrix of a 1D DCT transform of the columns of data X. As illustrated in FIG. 1, $C_{1D}$ will be stored in a transpose buffer. The rows (or columns) of the intermediate results matrix $C_{1D}$ are then transformed as follows $$C_{2D} = (C_{1D})^T D \qquad (3)$$

where $C_{2D}$ is the final DCT coefficients of the data X. Mathematically, the following matrix multiplication summarizes the coefficient extraction process:

$$C_{2D} = D^T X D \qquad (4)$$

The effective transform of application of an 8-point 1D DCT to columns then rows of the input data is shown in FIG. 3.

From a hardware implementation perspective, the size of the needed transpose buffer is a limiting factor. If this buffer is implemented as registers for best performance, the required number of gates increases significantly as the transform size increases. For example, consider a fixed-point implementation of a DCT transform as implemented in some versions of the HEVC test model software. The 4-point 1D DCT transform is defined as g_aiT4=[64,64,64,64; 83,36,−36,−83; 64,−64,−64,64; 36,−83,83,−36].

A coefficient resulting from application of this 4-point DCT transform is computed as follows:

c[0]=$\Sigma_j$(g_aiT4[0,j]·x[j])

and the bit width of a computed coefficient is given by (bitwidth of c)=(6-bit)+(9-bit)+(log$_2$(4)-bit).

where the bit width of a DC coefficient is 6, the bit width of the residual data being transformed is 9, and (log 2(4)-bit) comes from the summation of four 15-bit values. Thus, the bit width of each coefficient is 17.

In the HEVC test model software, for both encoding and decoding, the bit width of intermediate values of the separable transform computation stored in the transpose buffer is limited to 16 bits. Therefore, the bit width of each of the intermediate results is reduced by appropriate scaling factors, i.e., a shift value and an offset. For example, for the 4-point 1D DCT implementation described above, the intermediate result values are scaled as per $c_{(16\text{-}bit)} = (c_{(17\text{-}bit)} + \text{offset}) >> \text{shift}$ where >> denotes right bit shift (typically preferred in hardware and software implementations for division by powers of two), offset=1, and shift=1. The offset parameter is used for rounding and can be found by offset=2^(shift−1). The transpose buffer size needed for this fixed-point implementation of a 1D DCT is 4×4×16=256 bits. The needed size of the transpose buffer dramatically increases for larger transforms. For example, a 32×32 transform in HEVC needs 32×32×16=16384 bits of transpose buffer.

Various method embodiments for reducing the needed transpose buffer size are now described. The choice of which embodiment to use may depend on the accuracy requirement of the particular application. For example, in the context of video coding, transform computations are important in the rate-distortion cost calculations used for mode selection and in the transformation of the residual data prior to entropy coding. More specifically, as is well known, video coding has two main coding modes, inter-prediction and intra-prediction, and there may be several difference options for each of these modes. Each mode produces a residual signal with less energy than the original signal. The mode decision performed by compressing the resultant residuals of each mode and determining a rate and distortion cost for each. The mode with the minimum rate-distortion cost is used in the final encoding. This is generally referred to as the Rate-Distortion Optimum (RDO) decision.

Note that the RDO plays a decision role in video coding and final encoding, including transformation, is performed on the residual resulting from applying the chosen mode. Thus, the accuracy of the transforms used in RDO may not be as critical as that of the transforms used for the actual encoding. However, accuracy in the transforms used to produce the coefficients of the residual data for entropy encoding is important as the residual data will be reconstructed in a receiving decoder from these transform coefficients. Therefore, the transform design used for transformation of the residual data needs to be more accurate.

Two approaches for reducing transpose buffer size are presented: partitioning of a transform into smaller transforms which need less transpose buffer space and reducing the bit width of the intermediate results stored in the transpose buffer. The partitioning approach, described in reference to the method of FIG. 4, reduces accuracy and may be suitable for use in RDO. The various methods for reducing the bit width of the intermediate results yield acceptably accurate results and are suitable for both RDO and computation of the residual coefficients for entropy coding. The methods for reducing the bit width are also suitable for use in inverse transformation in a decoder. As is well known, inverse transformation using a separable transform also uses a transpose buffer to store the intermediate values.

FIG. 4 is a flow diagram of a method for computing a 2D separable transform for RDO. In general, a larger transform block is partitioned into smaller transforms, which allows the size of the transpose buffer to be smaller than that required by the larger transform computation. For purposes of explanation, an example of a 32×32 transform is used in which the transform block is partitioned into four 16×16 transform blocks. Other suitable partition sizes may be used, including non-square partitions, and other transform sizes may also be suitably partitioned. For this particular example, the size of the transpose buffer is reduced by 75% over the size needed for the full transform block.

Using non-linear approximation, the rate of the 32×32 transform can be approximated as follows:

$$R_{32\times32}=K\cdot\Sigma_{i=\{0,1,2,3\}}NZ^i{}_{16\times16}=K\cdot NZ$$

for $$NZ^i{}_{16\times16}=\#\{|Q\{C^i{}_{16\times16}\}|>0\}$$

where $C^i{}_{16\times16}$ is the coefficients of each 16×16 2D DCT transform, $Q\{\bullet\}$ symbolizes the quantization operation, and $NZ^i{}_{16\times16}$ is the number of non-zero coefficients after quantizing the coefficients of the i-th sub-block of size 16×16. The estimated rate for the 32×32 transform is then found by multiplication by a constant, K, with the summation of the non-zero coefficients of the sub-blocks. A value for K may be determined by linear regression $$\min_K \sum_{\forall j}(K\cdot NZ[j]-\text{Rate}[j])^2$$

where NZ[j] is the sum of the number of nonzero coefficients of the 16×16 sub-blocks for the j-th residual block of size 32×32 and Rate[j] is the actual rate of that 32×32 residual block once encoded with an entropy coder. For HEVC transforms, by using linear regression, empirical test shows that a good value for K for rate estimation for all block sizes is 4.9.

For distortion estimation, the distortions D of the 16×16 sub-blocks are determined and summed to find a distortion for the 32×32 block:

$$D_{32\times32}=\Sigma_{i=\{0,1,2,3\}}D^i{}_{16\times16}$$

for $$D^i{}_{16\times16}=\|Q\{C^i{}_{16\times16}\}-C^i{}_{16\times16}\|^2$$

where $\|\bullet\|^2$ is the L2 norm between the quantized and un-quantized coefficients. This formulation assumes a floating point implementation. For a fixed point implementation, appropriate scaling factors may be used. The rate-distortion cost may be computed as $$\text{Cost}=D_{32\times32}+\lambda R_{32\times32}$$

where $\lambda$ is the Lagrangian multiplier. Note that in the description above, the rate is estimated rather than applying entropy coding.

Depending on the partitioning scheme used, the required number of cycles to complete the RDO computation may increase. For example, while 32 cycles may be needed to read the 32×32 block, if the block is partitioned into four 16×16 blocks, 64 cycles may be needed to read the data. Rectangular partitioning such as 16×32 may reduce the read cycles needed. Further, the constructed residual block may have artifacts around the partition boundaries, thus possibly resulting in higher distortion values. A scaling factor may be applied to the distortion values to compensate for this effect at high quantization levels (QPs).

Methods to reduce the bit width of the intermediate results, thus reducing the needed transpose buffer size, are now described. These methods include fixed bit width reduction, variable bit width reduction, and hybrids that use both fixed and variable bit width reduction. Two methods for assigning a fixed bit width to the intermediate results of applying the first 1D transform of a separable 2D transform are presented. In the first method, the maximum value of the intermediate results is considered to find the appropriate scaling factor for the coefficients. The second method uses an optimization algorithm, where for a given data set and the desired bit width, the optimal scaling factor is found by a minimization algorithm.

As previously mentioned, HEVC specifies a maximum of 16-bits for the intermediate results of the first 1D transform. To achieve this, HEVC specifies the scaling and rounding to be performed to reduce the bit width of the intermediate results to 16. The example of FIG. 5 illustrates the actual intermediate result sizes and scaling of an early version of the HEVC model software for a 4×4 DCT transform. The intermediate results after the first 1D forward transform are scaled as follows:

$$c^1{}_{(16bit)}=(c^1{}_{(17bit)}+\text{offset\_1st})>>\text{shift\_1st}.$$

The intermediate results of the second forward 1D transform also require scaling to restrict the output of the 2D transform to 16 bits, i.e., $$C^2{}_{(16bit)}=(c^2{}_{(24\ bit)}+\text{offset\_2nd})>>\text{shift\_2nd}$$

The forward transform scaling factors after the first and the second 1D transforms depend on the size of the transform, primarily because the number of summands after N-point multiplication increases with transform size. Table 1 shows the values of the first and second shifts for each transform size as currently used in the HEVC test model software.

TABLE 1

| Transform size (N) | shift_1st | shift_2nd |
|---|---|---|
| 4-point | 1 | 8 |
| 8-point | 2 | 9 |
| 16-point | 3 | 10 |
| 32-point | 4 | 11 |

Similarly, inverse transforms are scaled to keep the bit width at 16 bits. With the assumption that there is no quantization, one can use same notation that is used in FIG. 5. FIG. 6 illustrates a 4×4 inverse transform (IDCT) with the actual coefficient sizes, where x is the reconstructed residual. The current HEVC test model software implements the 2D separable inverse transform as per $$c^1{}_{(16\ bit)}=(c^1{}_{(23\ bit)}+i\text{offset\_1st})>>i\text{shift\_1st}$$

$$i\text{offset\_1st}=1<<(i\text{shift\_1st}-1)$$

$$x_{(9\ bit)}=(x_{(21\ bit)}i\text{offset\_2nd})>>i\text{shift\_2nd}$$

$$i\text{offset\_2nd}=1<<(i\text{shift\_2nd}-1)$$

where ishift_1$^{st}$ and ioffset_1$^{st}$ are the shift and offset values for scaling the intermediate results of the first 1D inverse transform computation and ishift_2$^{nd}$ and ioffset_2$^{nd}$ are the shift and offset values for scaling the final result after applying the second 1D inverse transform. Table 2 shows the values of the first and second shifts for each inverse transform size as currently used in the HEVC test model software. As it can be seen in Table 2, the scaling factors for inverse filter is same for all transform sizes (due to the particular implementation of the inverse transform).

TABLE 2

| Transform size (N) | ishift_1st | ishift_2nd |
|---|---|---|
| All (4-, 8-, 16-, 32-point) | 7 | 12 |

Figure 7:
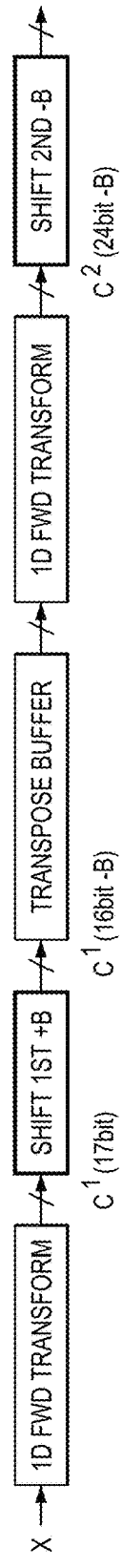
FIG. 7 illustrates an embodiment of a method showing a bit width of the intermediate result values for the forward transform.

The scaling used in HEVC to reduce the bit width is designed to retain the maximum possible coefficient value below 16 bits. FIG. 7 shows a method in which the bit width of the intermediate result values for the forward transform is further reduced, again using the 4×4 transform as an example. The equations for this reduction are:

$$c^1_{(16\ bit-B)} = c^1_{(17\ bit)} + \text{offset\_1st\_B}) >> (\text{shift\_1st} + B)$$

$$\text{offset\_1st\_B} = 1 << (\text{shift\_1st} + B - 1)$$

$$c^2_{(16\ bit)} = (c^2_{(24\ bit-B)} + \text{offset\_2nd\_B}) >> (\text{shift\_2nd} - B)$$

$$\text{offset\_2nd\_B} = 1 << (\text{shift\_2nd} - B - 1)$$

where the offsets and shifts are as shown above and B is the desired decrease in bit width of the intermediate coefficients. Note that the first scaling factor is increased by B to decrease the bit width of the intermediate coefficients. Further, to meet the HEVC requirement that the coefficients of the 2D transform are 16 bits, the second scaling factor for the output coefficients is reduced by B. Making scaling less stringent in the second stage helps to reduce the effect of more stringent scaling in the first stage. For example, let B=4. The bit width of the intermediate coefficients would be 12 bits. Note that the bit width of the $c^2$ is still 16 bits.

The bit width of the intermediate results of the inverse transform may be similarly reduced by a desired number of bits B, while retaining the required 16 bits of bit width for the output of the 2D inverse transform, i.e., $$c^1_{(16\ bit-B)} = (c^1_{(23\ bit)} + i\text{offset\_1st\_B}) >> (i\text{shift\_1st} + B)$$

$$i\text{offset\_1st\_B} = 1 << (i\text{shift\_1st} - 1)$$

$$x_{(9\ bit)} = (c^2_{(21\ bit-B)} + i\text{offset\_2nd}) >> i\text{shift\_2nd} - B)$$

$$i\text{offset\_2nd\_B} = 1 << (i\text{shift\_2nd} - B - 1)$$

The second method is an optimization algorithm, where for a given data set and the desired coefficient bit width, the optimal scaling factor is found by a minimization algorithm. Since the previous method considers the maximum possible value of each intermediate coefficient, there is no need to include clipping. In this method, both scaling and clipping are used. The clipping function is defined as $$\text{clip}(x, y) = \begin{cases} x = 2^{y-1}, & x \geq 2^{y-1} \\ x = -2^{y-1}, & x \leq -2^{y-1} \\ x, & \text{otherwise} \end{cases}$$

where variable x is restricted to y bits by clipping. The notation for clipping an M-bit variable to N bits (M>N) is as follows:

$$\{x\}|_N^M = \text{clip}(x_{(Mbit)}, N)$$

where the subscript denotes the bit width of the coefficients.

Figure 8:
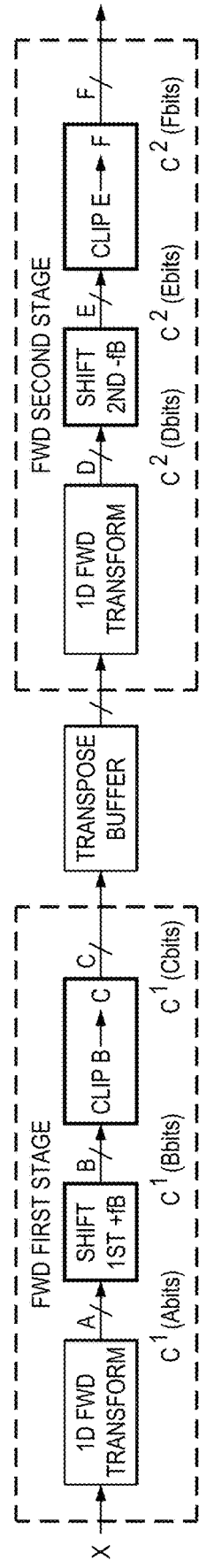
FIG. 8 illustrates an embodiment of a method for a forward transform with scaling and clipping in the two stages of applying the separable transform.
Figure 9:
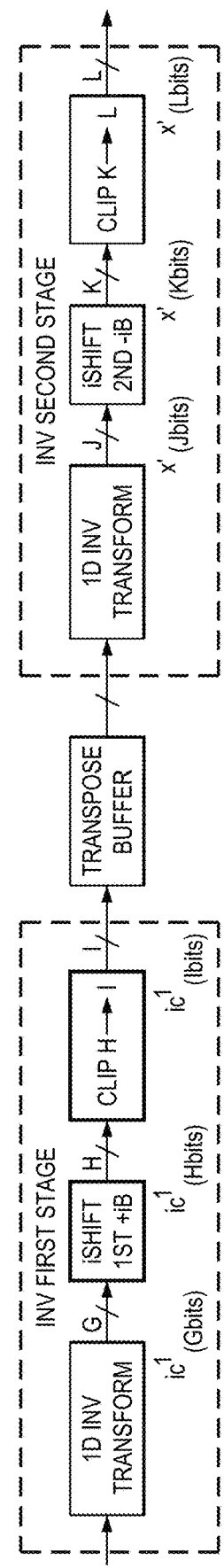
FIGS. 9-11 and 14 are flow diagrams of methods.

FIG. 8 illustrates the method for a forward transform with scaling and clipping in the two stages of applying the separable transform and FIG. 9 illustrates the method for an inverse transform. Note that scaling is achieved by binary left shifts. FIGS. 8 and 9 also show the intermediate bit width before and after each step using letters from A to F in FIG. 8 and G-L in FIG. 9. For example, in FIG. 8, the output of the first 1D transform in the first stage is A bits wide. This output is scaled by (shift_1 st+fB) to achieve a B-bit output.

The scaling factor for the inverse and forward transforms may be independent, i.e., may have different values. The additional scaling needed to achieve a desired bit width F (transpose buffer size) in the forward transform is denoted as fB and the additional scaling needed to achieve a desired bit width I (transpose buffer size) in the inverse transform is denoted as iB.

Figure 10:
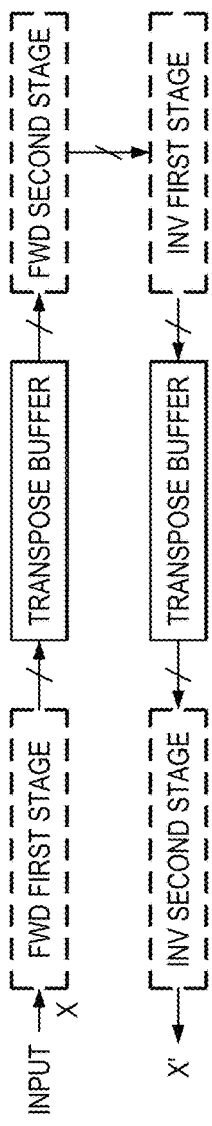

The value of fB is chosen to minimize distortion between the original signal x and the output of the inverse transform x', illustrated in the coupled forward and inverse transform design of FIG. 10. Similarly, the value of iB is chosen to minimize distortion (i.e., $\|x-x'\|$). In short, the following constrained minimization is solved:

$$\min_{fB}\left(\min_{iB} \|x - x'\|_2^2\right) \text{s.t.}\ \ Fbits = Ibits = \text{bitwidth}$$

where for a given transpose buffer bit width, the best values for fB and iB are found. Due to the small search space, optimal values for fB and iB for given data and transform size may be determined, for example, with a simple grid search. Note that this equation assumes that the same bit width constraints are applied to forward and inverse transforms. In some embodiments, different bit width values may be used. For example, the bit width of the intermediate results for a decoder and for an encoder may be determined independently. The bit width of the intermediate results for an encoder need not be same as the bit width of the intermediate results for a decoder receiving an encoded bit stream from that encoder.

Optimal scaling factors for various current transform sizes of HEVC, determined as per the above equation, are shown in Table 3. In Table 3, 'TB BITWIDTH' denotes the transpose buffer bit width, i.e., the fixed bit width to which the interim results are to be scaled before applying clipping. Depending on the transpose buffer budget and the required compression efficiency of the encoder, the desired transform size and bit width can be determined from Table 3. As an example, for an 8×8 transform and 'TB BITWIDTH'=8, the transpose buffer size would be 8×8×8=512 bits.

Referring to FIG. 8, the first stage forward transform scaling is defined as follows:

$$c^1_{(Bbits)} = (c^1_{(Abits)} + \text{offset\_1st}) >> (\text{shift\_1st} + fB)$$

$$\text{offset\_1st} = 1 << (\text{shift\_1st} + fB - 1)$$

and the first stage forward transform clipping is as defined follows:

$$c^1_{(Cbits)} = \{c^1_{(Bbits)}\}|_C^B.$$

The second stage forward transform scaling is defined as follows:

$$c^2_{(Ebits)} = (c^2_{(Dbits)} + \text{offset\_2nd}) >> (\text{shift\_2nd} - fB)$$

$$\text{offset\_2nd} = 1 << (\text{shift\_2nd} - fB - 1)$$

and the second stage forward transform clipping is defined as follows:

$$c^2_{(Fbits)} = \{c^2_{(Ebits)}\}|_F^E.$$

Referring to FIG. 9, the first stage inverse transform scaling is defined as follows:

$$ic^1_{(Hbits)}(ic^1_{(Gbits)} + i\text{offset\_1st}) >> (i\text{shift\_1st} + iB)$$

$$i\text{offset\_1st} = 1 << (i\text{shift\_1st} + iB - 1)$$

and the first stage inverse transform clipping is as defined follows:

$$ic^1_{(Ibits)} = \{ic^1_{(Hbits)}\}|_I^H.$$

The second stage inverse transform scaling is defined as follows:

$$x'_{(Kbit)} = (x'_{(JBits)} + \text{ioffset\_2nd}) >> (\text{ishift\_2nd} - iB)$$

$$\text{ioffset\_2nd} = 1 << (\text{ishift\_2nd} - iB - 1))$$

and the second stage inverse transform clipping is defined as follows:

$$x'_{(Lbits)} = \{x'_{(Kbits)}\}|_L^K.$$

TABLE 3

| 32 × 32 TRANSFORM | | | 16 × 16 TRANSFORM | | |
|---|---|---|---|---|---|
| TB BITWIDTH | 'fB' | 'iB' | TB BITWIDTH | 'fB' | 'iB' |
| 16 | 0 | 0 | 16 | 1 | 0 |
| 15 | 1 | 0 | 15 | 1 | 0 |
| 14 | 2 | 1 | 14 | 2 | 1 |
| 13 | 3 | 2 | 13 | 3 | 2 |
| 12 | 4 | 3 | 12 | 4 | 3 |
| 11 | 4 | 3 | 11 | 5 | 4 |
| 10 | 5 | 4 | 10 | 5 | 4 |
| 9 | 6 | 5 | 9 | 6 | 5 |
| 8 | 7 | 6 | 8 | 7 | 6 |
| 7 | 8 | 7 | 7 | 8 | 7 |
| 6 | 9 | 8 | 6 | 9 | 8 |
| 5 | 9 | 8 | 5 | 9 | 8 |
| 4 | 10 | 9 | 4 | 10 | 9 |

| 8 × 8 TRANSFORM | | | 4 × 4 TRANSFORM | | |
|---|---|---|---|---|---|
| TB BITWIDTH | 'fB' | 'iB' | TB BITWIDTH | 'fB' | 'iB' |
| 16 | 1 | 0 | 16 | 0 | 0 |
| 15 | 1 | 0 | 15 | 0 | 0 |
| 14 | 2 | 1 | 14 | 1 | 0 |
| 13 | 3 | 2 | 13 | 2 | 1 |
| 12 | 4 | 3 | 12 | 3 | 2 |
| 11 | 5 | 4 | 11 | 4 | 3 |
| 10 | 6 | 5 | 10 | 5 | 4 |
| 9 | 7 | 6 | 9 | 5 | 4 |
| 8 | 7 | 6 | 8 | 6 | 5 |
| 7 | 8 | 7 | 7 | 7 | 6 |
| 6 | 9 | 8 | 6 | 7 | 6 |
| 5 | 9 | 8 | 5 | 8 | 7 |
| 4 | 10 | 9 | 4 | 9 | 8 |

In some embodiments, in addition to reducing the bit width of the intermediate output of the forward and/or inverse transforms to a fixed bit width as per one of the previously described methods, a variable bit width (VBM) method may be used to further reduce the bit width of the intermediate outputs of applying the separable 2D transform. In VBM, the bit width requirement of each interim result is analyzed separately, and the transpose buffer size is set accordingly. Two methods are described for finding the best bit width values for each interim result of the transform such that distortion is minimal after forward and inverse transforms are applied. In the first method, the outliers of the distribution of the coefficients are analyzed and, depending on the given level of representation accuracy, bits are allocated to the interim results. In the second method, all interim results are considered to contribute equally to the overall distortion; thus, the method seeks a bit width that gives a defined level of distortion for each interim result.

Figure 11:
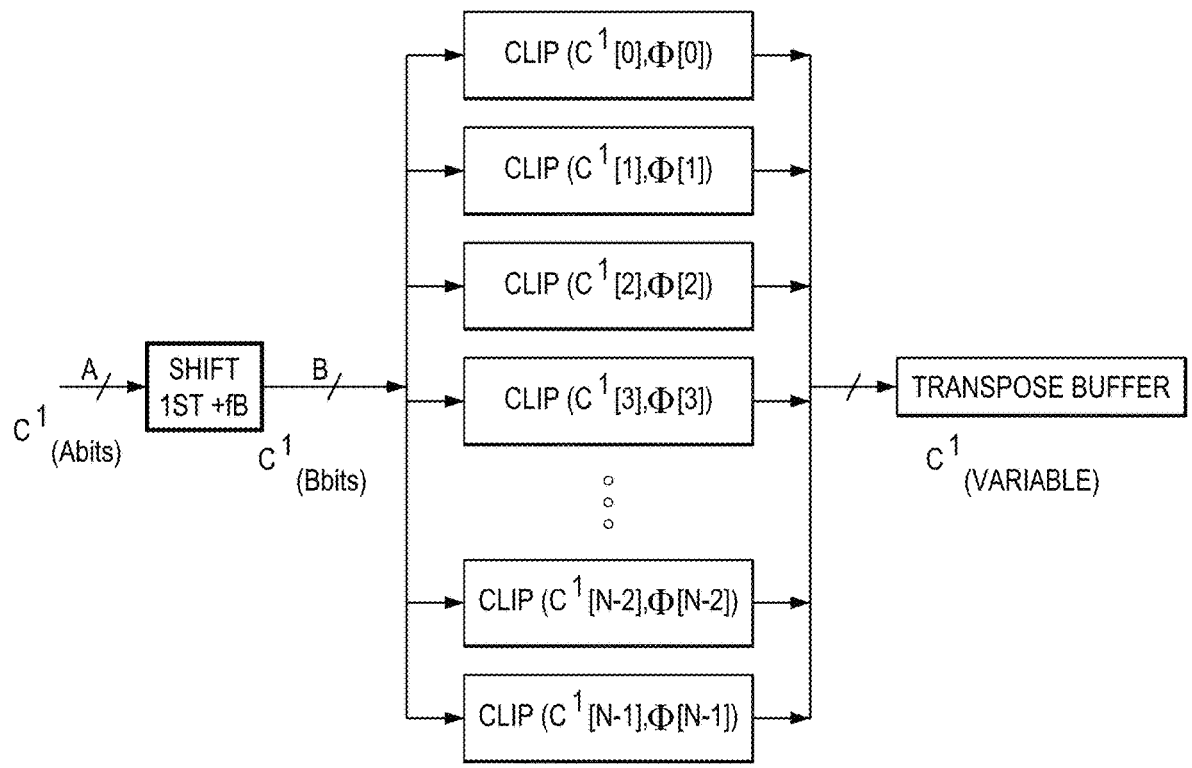

FIG. 11 shows a portion of the data flow for the first stage of the forward transform with variable bit width intermediate results. The same shift by fB as depicted in the method of FIG. 8 is applied to all intermediate result values. However, each intermediate result of an N-point transform is clipped separately and a vector φ supplies the corresponding bit width values. Two methods to find the vector φ with minimal distortion are described. The distortion is measured between the input to the forward transform x and the output of the inverse transform x' as shown in FIG. 10.

Figure 12:
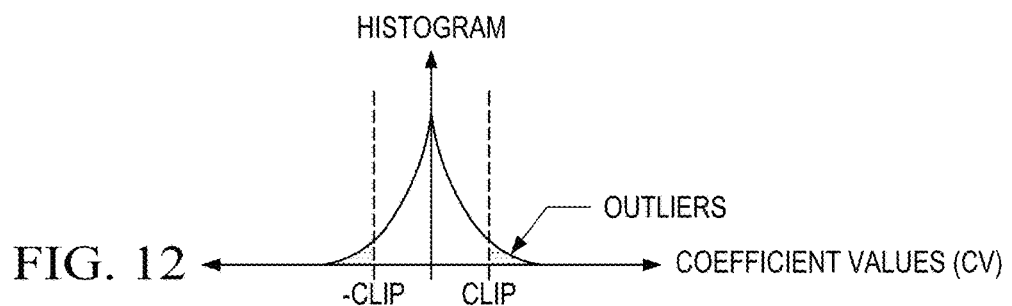
FIGS. 12 and 13 are examples.

In the first method, after the 1D N-point transform (both for forward and inverse transforms), the histogram of distributions for given data set is extracted. The histogram is normalized by the total sum of observations to get an approximate probability distribution. FIG. 12 shows an example histogram distribution of coefficient values cv. In this figure, the value of CLIP can be thought as the desired bit width that is restricting the values of the coefficient. As a result, using Parseval's theorem, one can find the distortion imposed by clipping the values above the CLIP level. However, due to scaling of the coefficients, Parseval's theorem cannot be used if the scaling factors are not known exactly. One solution is to define distortion as a relative value. In other words, the approximate probability distribution for a coefficient histogram as depicted in FIG. 12 may be determined as per $$\text{Distortion} = \frac{\sum_{|CV|>CLIP} H(CV)}{\sum_{\forall CV} H(CV)}$$

where H(•) is the histogram function which returns the number of times cv is observed and % Distortion is the relative distortion. Therefore, the required bit width for a given relative distortion level can be extracted. Using the notation in FIG. 11, the CLIP level that minimizes ∀i, $$\Phi[i] = \arg\min_{CLIP}\left(\left|\% \text{ Distortion} \times \sum_{\forall c[i]} H(c^1[i]) - \sum_{|c^1[i]|>CLIP} H(c^1[i])\right|\right)$$

for the coefficient $c^1[i]$ is used as the bit width of that coefficient ($\Phi[i]$).

In the second method, each coefficient contributes equally to the distortion introduced by the clipping operation. The CLIP value may be expressed in terms of bit width/bit depth BW as follows:

$$\text{CLIP} = 2^{(BW-1)}.$$

Given the previous definition for the clipping function clip(x, y), a coefficient cv that is clipped to BW bits can be expressed as $$CV_{BW} = \text{clip}(CV, BW).$$

The distortion or error between the clipped and the original coefficient values is defined as $$\text{distortion} = \|CV - CV_{BW}\|_2^2$$

Then, bit widths of the coefficients are determined that give the same distortion/error values.

Figure 13:
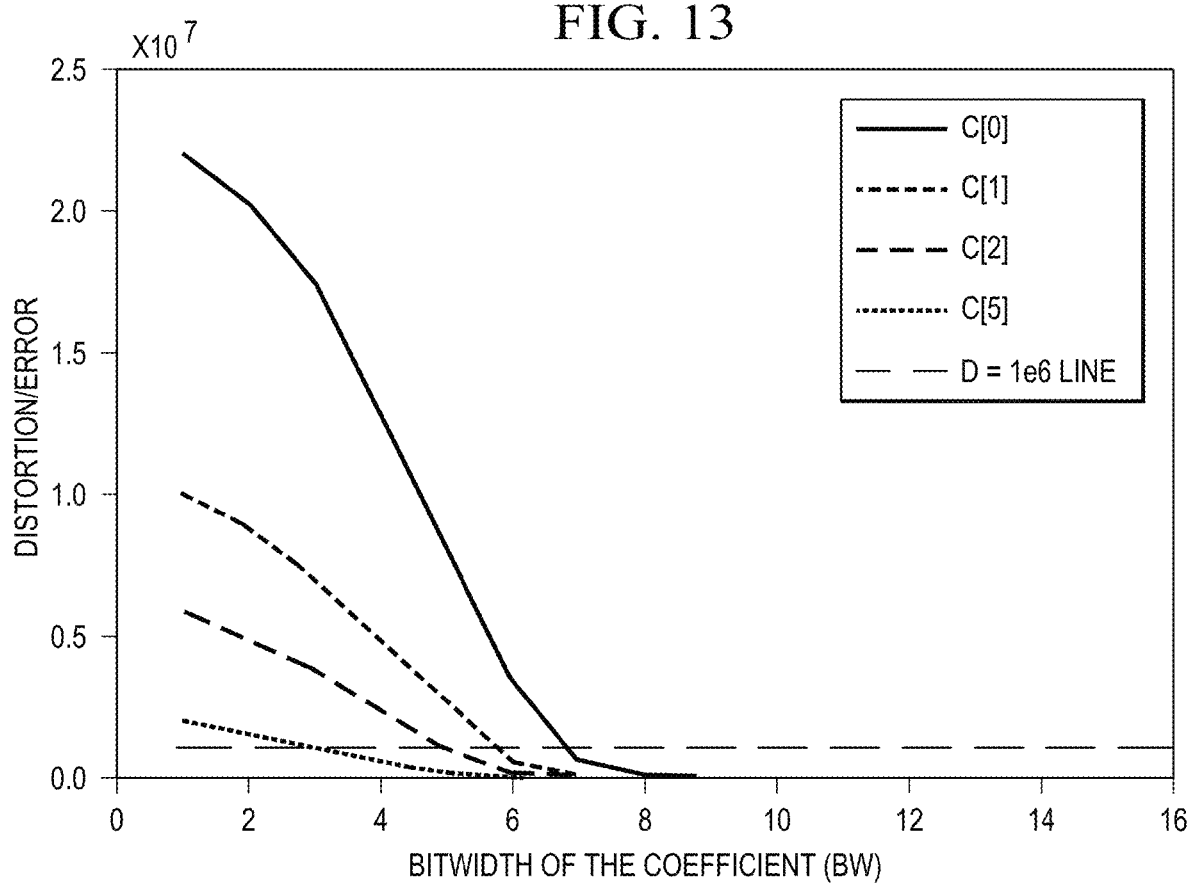

FIG. 13 shows a plot of distortion/error $\|CV-CV_{BW}\|_2^2$ versus coefficient bit width BW for different coefficients for a 16 point DCT transform. Note the values of the bit widths where curves intersect with D=1e6 line. These values show the bit width requirements of each coefficient at the same distortion/error level D. Because fractional bit width values cannot be used, these BW values are rounded up, such that distortion/error will be lower than D. Therefore, 5.7 will become 6 bits, 6.8 will become 7 bits, etc. In short, for each coefficient shown in FIG. 11, the corresponding bit width can be determined as follows, where Z denotes integer values:

∀i, $$\Phi[i] = \arg\min BW$$

s.t $D - \|c^1[i] - (c^1[i])_{BW}\| \geq 0$ and $BW \in Z$

In some embodiments, in a software implementation, the bit width may be limited a fixed set of values such as 8 or 16. For such implementations, the vector $\phi_{soft}$ may be derived from $\phi$ determined above as per:

$$\Phi_{soft}[i] = \begin{cases} \Phi[i] <= 8 & 8 - \text{bits} \\ \Phi[i] > 8 & 16 - \text{bits} \end{cases}$$

The following process may be used to find the best bit width values of an N-point 1-D transform for a given transpose buffer size $$TBS(D) = \sum_{i=0}^{N-1} \Phi[i]$$

where TBS is the transpose buffer size. Note that TBS and $\phi$ are functions of distortion/error D or % distortion (depending on the method used to find $\phi$). Therefore, for a given transpose buffer size, gTBS, the optimum D* is found that yields a TBS value close to gTBS, i.e., $$D^* = \min_D (TBS(D) - gTBS)^2.$$

Then, the optimal D* is used to find the best bit width allocation $\phi^*$ for the transform as per ∀i, $$\Phi[i] = \arg\min BW$$

s.t $D - \|c^1[i] - (c^1[i])_{BW}\| \geq 0$ and $BW \in Z$

Referring again to FIG. 11, the first stage forward transform scaling of the variable bit width method is defined as follows:

$$c^1_{(Bbits)} = (c^1_{(Abits)} + \text{offset\_1st}) >> (\text{shift\_1st} + fB)$$

$$\text{offset\_1st} = 1 << (\text{shift\_1st} + fB - 1)$$

and the first stage forward transform clipping is defined as follows for each coefficient n from 1 to N:

$$c^1_{(Variable)}[n] = \{c^1_{(Bbits)}[n]\}|_{\Phi[n]}^B$$

The second stage, which is not shown in FIG. 11, is the same as that of FIG. 8. The second stage forward transform scaling is defined as follows:

$$c^2_{(Ebits)} = (c^2_{(Dbits)} + \text{offset\_2nd}) >> (\text{shift\_2nd} - fB)$$

$$\text{offset\_2nd} = 1 << (\text{shift\_2nd} - fB - 1)$$

and the second stage forward transform clipping is defined as follows:

$$c^2_{(Fbits)} = \{c^2_{(Ebits)}\}|_F^E.$$

Note that fB for the second stage can be adjusted based on variable bit width results. For example, for a given fB value, if it is observed that space is still available in the transpose buffer budget, the value of fB may be reduced. Or, if it is observed that the variable bit width results are too large for the transpose buffer budget, the value of fB may be reduced.

One of ordinary skill in the art will understand embodiments of the VBM method for inverse transforms. The first stage inverse transform scaling of the variable bit width method is defined as follows:

$$ic^1_{(Hbits)}(ic^1_{(Gbits)} + i\text{offset\_1st}) >> (i\text{shift\_1st} + iB)$$

$$i\text{offset\_1st} = 1 << (i\text{shift\_1st} + iB - 1)$$

and the first stage inverse transform clipping is defined as follows for each interim value n from 1 to N:

$$ic^1_{(Variable)}[n] = \{ic^1_{(Hbits)}[n]\}|_{\Phi[n]}^H.$$

The second stage is the same as that of FIG. 9. The second stage inverse transform scaling is defined as follows:

$$x'_{(Kbit)} = (x'_{(JBits)} + i\text{offset\_2nd}) >> (i\text{shift\_2nd} - iB)$$

$$i\text{offset\_2nd} = 1 << (i\text{shift\_2nd} - iB - 1))$$

and the second stage inverse transform clipping is defined as follows:

$$x'_{(Lbits)} = \{x'_{(Kbits)}\}|_L^K.$$

Figure 14:
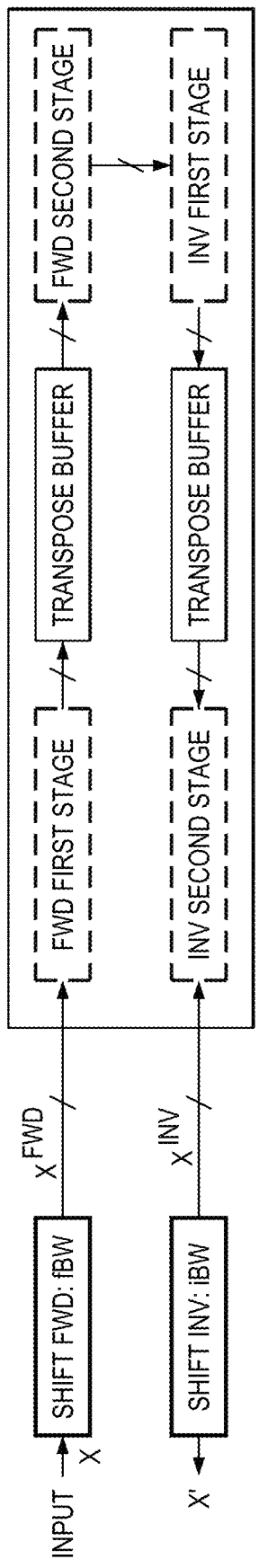

Another way to reduce the required size of the transpose buffer is to reduce the bit width of the input data. FIG. 14 shows a flow diagram of a method for reducing the bit width of the input data. A scaling operator is added before the forward transform and after the inverse transform. The operation of these two scaling operators are given by $$x\text{FWD} = \{x\}|_K^K - fBW$$

$$x' = \{x\text{INV}\}|_L^L + iBW$$

where K is the bit width of the input and L is the bit width of the output of the inverse transform. fBW is the scaling factor for the forward transform, and iBW is the scaling factor needed to scale the output back to the original dynamic range such that the following equation is minimized:

$$\min_{fBW}\left(\min_{iBW} \|x - x'\|_2^2\right).$$

Note that reducing the bit width of the input reduces the number of cycles required to load the data to the arithmetic unit. Similarly, the bit width of the intermediate values can also be adjusted to reduce the cycles.

Figure 15:
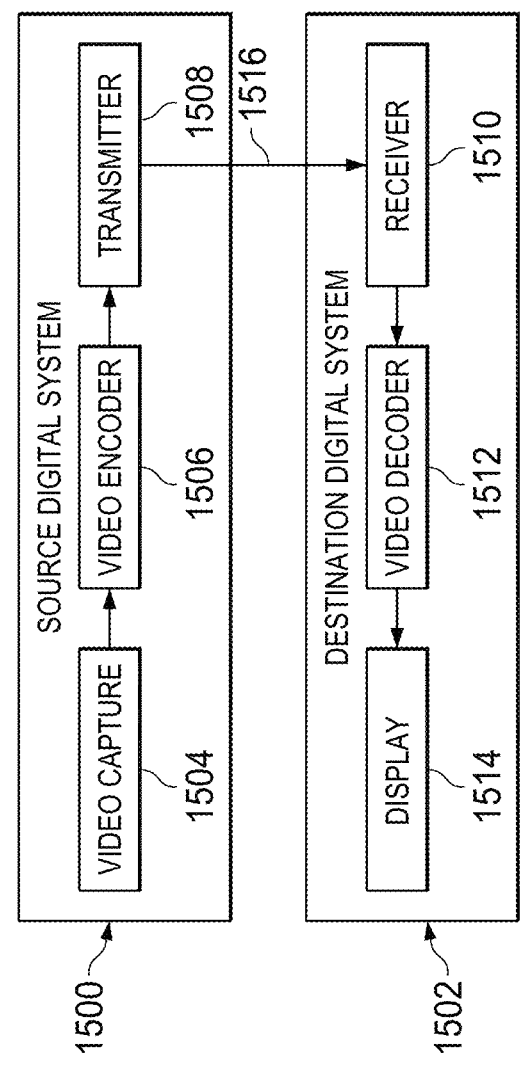
FIG. 15 is a block diagram of a digital system.

FIG. 15 shows a block diagram of a digital system that includes a source digital system 1500 that transmits encoded video sequences to a destination digital system 1502 via a communication channel 1516. The source digital system 1500 includes a video capture component 1504, a video encoder component 1506, and a transmitter component 1508. The video capture component 1504 is configured to provide a video sequence to be encoded by the video encoder component 1506. The video capture component 1504 may be, for example, a video camera, a video archive, or a video feed from a video content provider. In some embodiments, the video capture component 1504 may generate computer graphics as the video sequence, or a combination of live video, archived video, and/or computer-generated video.

The video encoder component 1506 receives a video sequence from the video capture component 1504 and encodes it for transmission by the transmitter component 1508. The video encoder component 1506 receives the video sequence from the video capture component 1504 as a sequence of pictures, divides the pictures into largest coding units (LCUs), and encodes the video data in the LCUs. The video encoder component 1506 may be configured to apply forward and/or inverse transforms in which intermediate transform results are reduced to variable bit widths during the encoding process as described herein. An embodiment of the video encoder component 1506 is described in more detail herein in reference to FIG. 16.

The transmitter component 1508 transmits the encoded video data to the destination digital system 1502 via the communication channel 1516. The communication channel 1516 may be any communication medium, or combination of communication media suitable for transmission of the encoded video sequence, such as, for example, wired or wireless communication media, a local area network, or a wide area network.

The destination digital system 1502 includes a receiver component 1510, a video decoder component 1512 and a display component 1514. The receiver component 1510 receives the encoded video data from the source digital system 1500 via the communication channel 1516 and provides the encoded video data to the video decoder component 1512 for decoding. The video decoder component 1512 reverses the encoding process performed by the video encoder component 1506 to reconstruct the LCUs of the video sequence. The video decoder component 1512 may be configured to apply inverse transforms in which intermediate transform results are reduced to variable bit widths during the decoding process as described herein. An embodiment of the video decoder component 1512 is described in more detail below in reference to FIG. 17.

The reconstructed video sequence is displayed on the display component 1514. The display component 1514 may be any suitable display device such as, for example, a plasma display, a liquid crystal display (LCD), a light emitting diode (LED) display, etc.

In some embodiments, the source digital system 1500 may also include a receiver component and a video decoder component and/or the destination digital system 1502 may include a transmitter component and a video encoder component for transmission of video sequences both directions for video streaming, video broadcasting, and video telephony. Further, the video encoder component 1506 and the video decoder component 1512 may perform encoding and decoding in accordance with one or more video compression standards. The video encoder component 1506 and the video decoder component 1512 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 16:
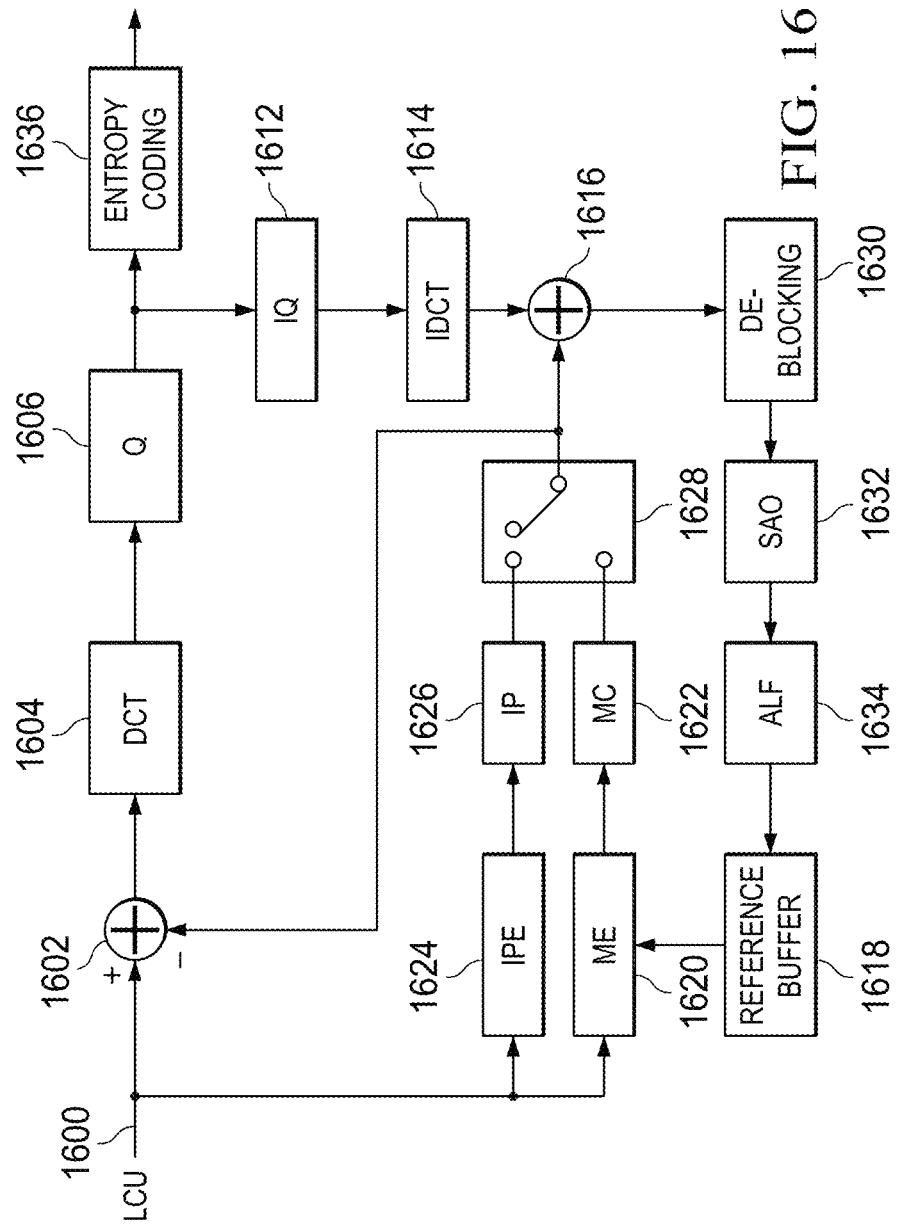
FIG. 16 is a block diagram of a video encoder.

FIG. 16 is a block diagram of the LCU processing portion of an example video encoder. As is explained in more detail below, the video encoder is configured to compute 2D separable transforms (forward and inverse) with variable bit width intermediate results. A coding control component (not shown) sequences the various operations of the LCU processing, i.e., the coding control component runs the main control loop for video encoding. The coding control component receives a digital video sequence and performs any processing on the input video sequence that is to be done at the picture level, such as determining the coding type (I, P, or B) of a picture based on the high level coding structure, e.g., IPPP, IBBP, hierarchical-B, and dividing a picture into LCUs for further processing.

In addition, for pipelined architectures in which multiple LCUs may be processed concurrently in different components of the LCU processing, the coding control component controls the processing of the LCUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different LCUs of a picture at any given time. That is, the slave processing modules are executed in parallel, each processing its respective LCU while data movement from one processor to another is serial.

The coding control component determines the scaling factors and clip bit widths that are to be used for forward and inverse transform computation by the transform component 1604 and the inverse transform component 1614. The coding control component also determines the scaling factors and clip bit widths that are to be used for forward transform computation in the determination of rate distortion costs for the motion estimation component 1620 and the intra-prediction estimation component 1624. Initially, a predetermined scaling factor and a set of clip bit widths, e.g., a vector $\phi$, for each transform unit size is used. The predetermined scaling factor and set of clip bit widths for each transform unit size may be determined empirically based on the size of the transpose buffer 1605 using methods previously described herein. As a video sequence is encoded, the coding control component may adapt the scaling factors and/or clip bit widths to maintain the quality of the encoded bit stream. A method for adapting the scaling factors and/or clip bit widths that may be used is described below in reference to FIG. 21. Other adaptation methods may be used based on the above described techniques for determining scaling factors and clip bit widths.

The LCU processing receives LCUs 1600 of the input video sequence from the coding control component and encodes the LCUs 1600 under the control of the coding control component to generate the compressed video stream. The LCUs 1600 in each picture are processed in row order. The LCUs 1600 from the coding control component are provided as one input of a motion estimation component (ME) 1620, as one input of an intra-prediction estimation component (IPE) 1624, and to a positive input of a combiner 1602 (e.g., adder or subtractor or the like). Further, although not specifically shown, the prediction mode of each picture as selected by the coding control component is provided to a mode decision component 1628 and the entropy coding component 1636.

The storage component 1618 provides reference data to the motion estimation component 1620 and to the motion compensation component 1622. The reference data may include one or more previously encoded and decoded pictures, i.e., reference pictures.

The motion estimation component 1620 provides motion data information to the motion compensation component 1622 and the entropy coding component 1636. More specifically, the motion estimation component 1620 performs tests on CUs in an LCU based on multiple inter-prediction modes (e.g., skip mode, merge mode, and normal or direct inter-prediction), PU sizes, and TU sizes using reference picture data from storage 1618 to choose the best CU partitioning, PU/TU partitioning, inter-prediction modes, motion vectors, etc. based on coding cost, e.g., a rate distortion coding cost. A method for computing the rate distortion coding cost for a TU that may be used in some embodiments is described herein in reference to FIG. 18. To perform the tests, the motion estimation component 1620 may divide an LCU into CUs according to the maximum hierarchical depth of the quadtree, and divide each CU into PUs according to the unit sizes of the inter-prediction modes and into TUs according to the transform unit sizes, and calculate the coding costs for each PU size, prediction mode, and transform unit size for each CU. The motion estimation component 1620 provides the motion vector (MV) or vectors and the prediction mode for each PU in the selected CU partitioning to the motion compensation component (MC) 1622.

The motion compensation component 1622 receives the selected inter-prediction mode and mode-related information from the motion estimation component 1620 and generates the inter-predicted CUs. The inter-predicted CUs are provided to the mode decision component 1628 along with the selected inter-prediction modes for the inter-predicted PUs and corresponding TU sizes for the selected CU/PU/TU partitioning. The coding costs of the inter-predicted CUs are also provided to the mode decision component 1628.

The intra-prediction estimation component 1624 (IPE) performs intra-prediction estimation in which tests on CUs in an LCU based on multiple intra-prediction modes, PU sizes, and TU sizes are performed using reconstructed data from previously encoded neighboring CUs stored in a buffer (not shown) to choose the best CU partitioning, PU/TU partitioning, and intra-prediction modes based on coding cost, e.g., a rate distortion coding cost. To perform the tests, the intra-prediction estimation component 1624 may divide an LCU into CUs according to the maximum hierarchical depth of the quadtree, and divide each CU into PUs according to the unit sizes of the intra-prediction modes and into TUs according to the transform unit sizes, and calculate the coding costs for each PU size, prediction mode, and transform unit size for each PU. A method for computing the rate distortion coding cost for a TU that may be used in some embodiments is described herein in reference to FIG. 18. The intra-prediction estimation component 1624 provides the selected intra-prediction modes for the PUs, and the corresponding TU sizes for the selected CU partitioning to the intra-prediction component (IP) 1626. The coding costs of the intra-predicted CUs are also provided to the intra-prediction component 1626.

The intra-prediction component 1626 (IP) receives intra-prediction information, e.g., the selected mode or modes for the PU(s), the PU size, etc., from the intra-prediction estimation component 1624 and generates the intra-predicted CUs. The intra-predicted CUs are provided to the mode decision component 1628 along with the selected intra-prediction modes for the intra-predicted PUs and corresponding TU sizes for the selected CU/PU/TU partitioning. The coding costs of the intra-predicted CUs are also provided to the mode decision component 1628.

The mode decision component 1628 selects between intra-prediction of a CU and inter-prediction of a CU based on the intra-prediction coding cost of the CU from the intra-prediction component 1626, the inter-prediction coding cost of the CU from the motion compensation component 1622, and the picture prediction mode provided by the coding control component. Based on the decision as to whether a CU is to be intra- or inter-coded, the intra-predicted PUs or inter-predicted PUs are selected. The selected CU/PU/TU partitioning with corresponding modes and other mode related prediction data (if any) such as motion vector(s) and reference picture index (indices), are provided to the entropy coding component 1636.

The output of the mode decision component 1628, i.e., the predicted PUs, is provided to a negative input of the combiner 1602 and to the combiner 1638. The associated transform unit size is also provided to the transform component 1604. The combiner 1602 subtracts a predicted PU from the original PU. Each resulting residual PU is a set of pixel difference values that quantify differences between pixel values of the original PU and the predicted PU. The residual blocks of all the PUs of a CU form a residual CU for further processing.

The transform component 1604 performs block transforms on the residual CUs to convert the residual pixel values to transform coefficients and provides the transform coefficients to a quantize component 1606. More specifically, the transform component 1604 receives the transform unit sizes for the residual CU and applies transforms of the specified sizes to the CU to generate transform coefficients. The transpose buffer 1605 stores the intermediate results of the transform computation. A method for applying a transform that may be used in some embodiments is described herein in reference to FIG. 19. Further, the quantize component 1606 quantizes the transform coefficients based on quantization parameters (QPs) and quantization matrices provided by the coding control component and the transform sizes and provides the quantized transform coefficients to the entropy coding component 1636 for coding in the bit stream.

The entropy coding component 1636 entropy encodes the relevant data, i.e., syntax elements, output by the various encoding components and the coding control component using context-adaptive binary arithmetic coding (CABAC) to generate the compressed video bit stream. Among the syntax elements that are encoded are picture parameter sets, flags indicating the CU/PU/TU partitioning of an LCU, the prediction modes for the CUs, and the quantized transform coefficients for the CUs.

The LCU processing includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures.

The quantized transform coefficients for each CU are provided to an inverse quantize component (IQ) 1612, which outputs a reconstructed version of the transform result from the transform component 1604. The dequantized transform coefficients are provided to the inverse transform component (IDCT) 1614, which outputs estimated residual information representing a reconstructed version of a residual CU. The inverse transform component 1614 receives the transform unit size used to generate the transform coefficients and applies inverse transform(s) of the specified size to the transform coefficients to reconstruct the residual values. The transpose buffer 1605 stores the intermediate results of the inverse transform computation. A method for applying an inverse transform that may be used in some embodiments is described herein in reference to FIG. 20. The reconstructed residual CU is provided to the combiner 1638.

The combiner 1638 adds the original predicted CU to the residual CU to generate a reconstructed CU, which becomes part of reconstructed picture data. The reconstructed picture data is stored in a buffer (not shown) for use by the intra-prediction estimation component 1624.

Various in-loop filters may be applied to the reconstructed picture data to improve the quality of the reference picture data used for encoding/decoding of subsequent pictures. The in-loop filters may include a deblocking filter 1630, a sample adaptive offset filter (SAO) 1632, and an adaptive loop filter (ALF) 1634. The in-loop filters 1630, 1632, 1634 are applied to each reconstructed LCU in the picture and the final filtered reference picture data is provided to the storage component 1618. In some embodiments, the ALF component 1634 is not present.

Figure 17:
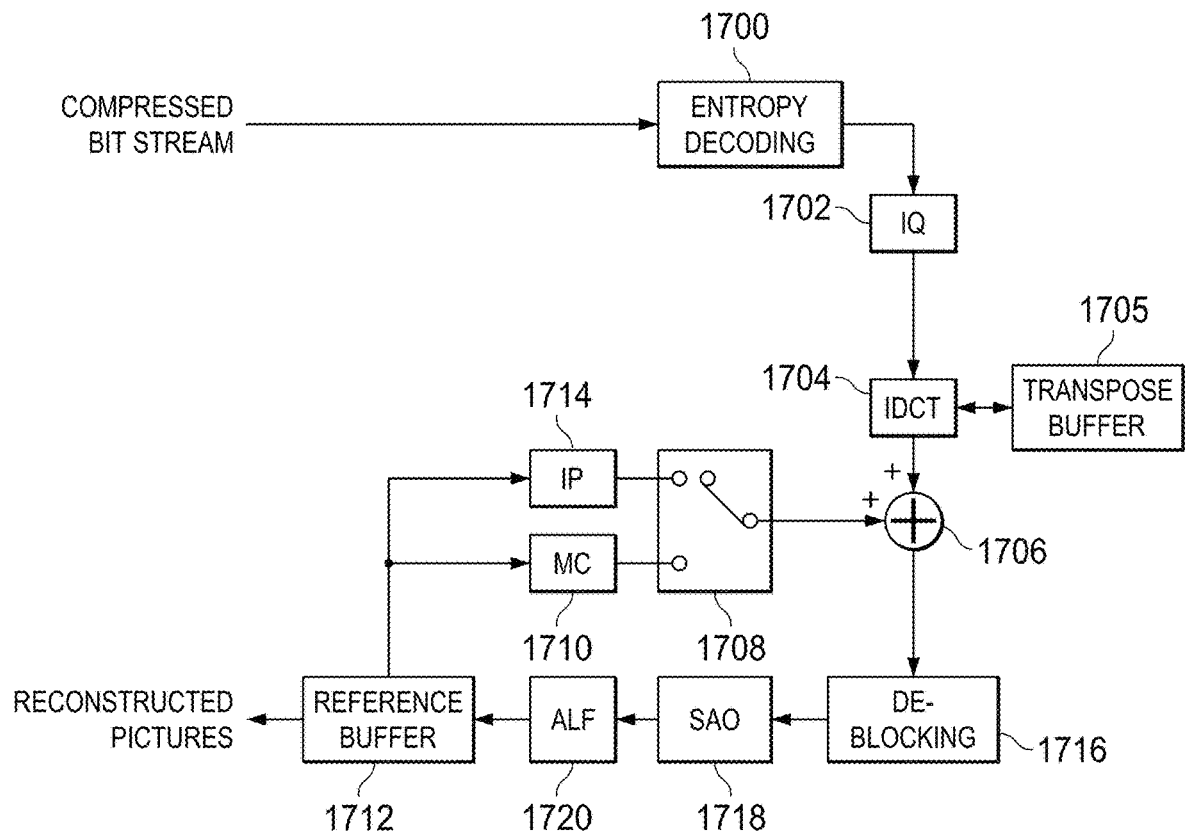
FIG. 17 is a block diagram of a video decoder.

FIG. 17 is a block diagram of an example video decoder. The video decoder operates to reverse the encoding operations, i.e., entropy coding, quantization, transformation, and prediction, performed by the video encoder of FIG. 16 to regenerate the pictures of the original video sequence. In view of the above description of a video encoder, one of ordinary skill in the art will understand the functionality of components of the video decoder without detailed explanation.

The entropy decoding component 1700 receives an entropy encoded (compressed) video bit stream and reverses the entropy encoding using CABAC decoding to recover the encoded syntax elements, e.g., CU, PU, and TU structures of LCUs, quantized transform coefficients for CUs, motion vectors, prediction modes, LCU specific SAO information, etc. The decoded syntax elements are passed to the various components of the decoder as needed. For example, decoded prediction modes are provided to the intra-prediction component (IP) 1714 or motion compensation component (MC) 1710. If the decoded prediction mode is an inter-prediction mode, the entropy decoder 1700 reconstructs the motion vector(s) as needed and provides the motion vector(s) to the motion compensation component 1710.

The inverse quantize component (IQ) 1702 de-quantizes the quantized transform coefficients of the CUs. The inverse transform component 1704 transforms the frequency domain data from the inverse quantize component 1702 back to the residual CUs. That is, the inverse transform component 1704 applies an inverse unit transform, i.e., the inverse of the unit transform used for encoding, to the de-quantized residual coefficients to produce reconstructed residual values of the CUs. The transpose buffer 1705 stores the intermediate results of the inverse transform computation. A method for applying an inverse transform to a transform unit of residual coefficients that may be used in some embodiments is described herein in reference to FIG. 20.

A residual CU supplies one input of the addition component 1706. The other input of the addition component 1706 comes from the mode switch 1708. When an inter-prediction mode is signaled in the encoded video stream, the mode switch 1708 selects predicted PUs from the motion compensation component 1710 and when an intra-prediction mode is signaled, the mode switch selects predicted PUs from the intra-prediction component 1714.

The motion compensation component 1710 receives reference data from the storage component 1712 and applies the motion compensation computed by the encoder and transmitted in the encoded video bit stream to the reference data to generate a predicted PU. That is, the motion compensation component 1710 uses the motion vector(s) from the entropy decoder 1700 and the reference data to generate a predicted PU.

The intra-prediction component 1714 receives reconstructed samples from previously reconstructed PUs of a current picture from the storage component 1712 and performs the intra-prediction computed by the encoder as signaled by an intra-prediction mode transmitted in the encoded video bit stream using the reconstructed samples as needed to generate a predicted PU.

The addition component 1706 generates a reconstructed CU by adding the predicted PUs selected by the mode switch 1708 and the residual CU. The output of the addition component 1706, i.e., the reconstructed CUs, is stored in the storage component 1712 for use by the intra-prediction component 1714.

In-loop filters may be applied to reconstructed picture data to improve the quality of the decoded pictures and the quality of the reference picture data used for decoding of subsequent pictures. The applied in-loop filters are the same as those of the encoder, i.e., a deblocking filter 1716, a sample adaptive offset filter (SAO) 1718, and an adaptive loop filter (ALF) 1720. The in-loop filters may be applied on an LCU-by-LCU basis and the final filtered reference picture data is provided to the storage component 1712. In some embodiments, the ALF component 1720 is not present.

Figure 18:
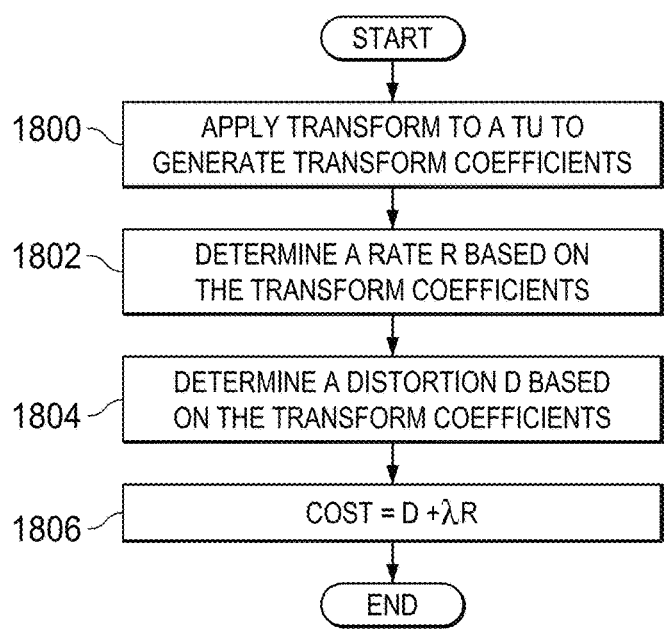
FIG. 18 is a flow diagram of a rate-distortion cost computation method.

FIG. 18 is a flow diagram of a method for computing a rate distortion cost that may be used in the encoder of FIG. 16. The input to this method is a transform unit (TU) of residual values. Initially, a 2D separable transform of the same size as the TU is applied 1800 to the TU to generate a block of transform coefficients of the same size. For example, if the TU is 32×32, the 2D transform is 32×32. A method for applying a transform to a TU is described below in reference to FIG. 19. Note that the transpose buffer used for rate distortion computation may be a different transpose buffer than that used for the forward and inverse transform computations of the transform component 1604 and the inverse transform component 1614.

A rate R is then determined 1802 based on the transform coefficients. For example, the rate R may be computed by counting the number of nonzero coefficients of the 2D transform above a threshold value, where the threshold value is a function of the quantization level. A distortion D is also determined 1804 based on the transform coefficients. For example, the distortion D may be computed as the sum of the squares of the transform coefficients that are below the threshold value. The rate distortion cost for the TU is then computed 1806 as per $$\text{Cost}=D+\lambda R$$

where λ is the Lagrangian multiplier.

Figure 19:
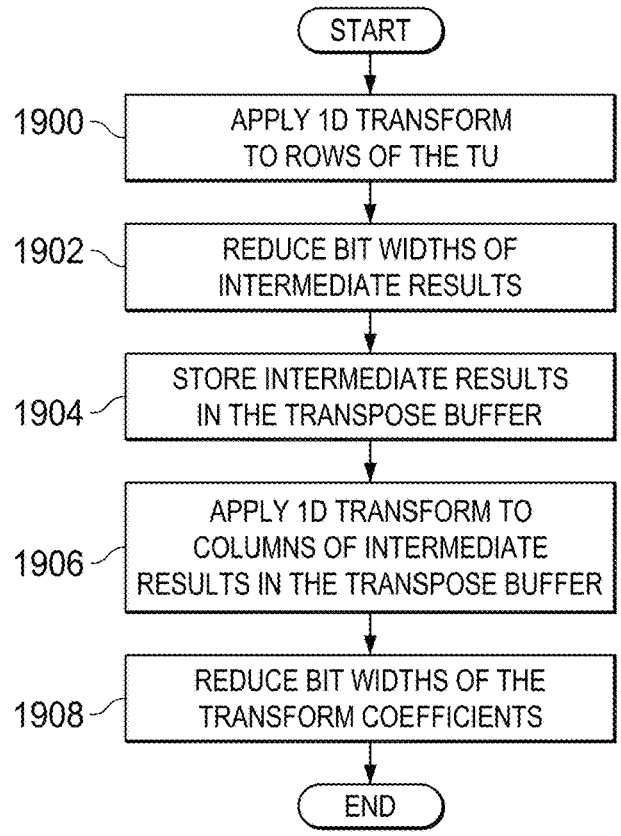
FIG. 19 is a flow diagram of a method for applying a forward transform.

FIG. 19 is a flow diagram of a method for applying a 2D separable forward transform to a TU of residual values. The method assumes that a scaling factor and a set of clip bit widths (one for each coefficient position) are provided for the transform of the same size as the TU. The method is described assuming that the 1D transforms of the separable 2D transform are applied to rows and then to columns. One of ordinary skill in the art will understand embodiments in which the application order is columns followed by rows.

Initially, a 1D transform is applied 1900 to the rows of the TU. The bit widths of the intermediate results from the application of this 1D transform are then reduced 1902 according to the scaling factor and the set of clip bit widths. More specifically, the scaling factor is first applied to each intermediate result to reduce the bit width of each intermediate result to the same fixed bit width, e.g., 12. Then, each scaled intermediate result is clipped according to the corresponding clip bit width in the set of clip bit widths. As was previously discussed, the final bit widths of the intermediate results may be varying sizes as the clip bit widths in the set of clip bit widths may vary.

The reduced bit width intermediate results are stored 1904 in the transpose buffer. A 1D transform is then applied 1906 to the columns of the intermediate results stored in the transpose buffer to generate a block of transform coefficients. The bit widths of the transform coefficients are reduced 1908 to the desired coefficient bit width, e.g., by scaling and clipping.

Figure 20:
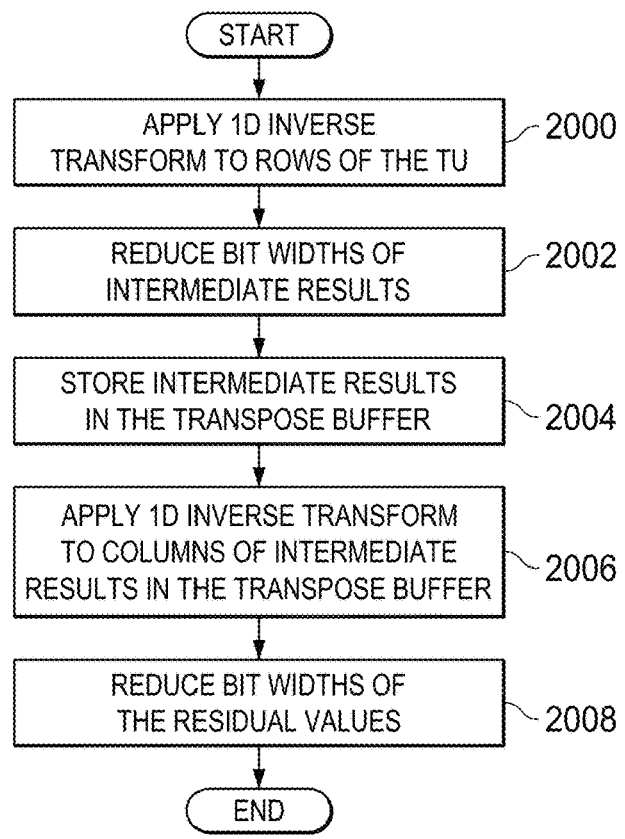
FIG. 20 is a flow diagram of a method for applying an inverse transform.

FIG. 20 is a flow diagram of a method for applying a 2D separable inverse transform to a TU of transform coefficients. The method assumes that a scaling factor and a set of clip bit widths (one for each coefficient position) are provided for the transform of the same size as the TU. The method is described assuming that the 1D inverse transforms of the separable 2D inverse transform are applied to rows and then to columns. One of ordinary skill in the art will understand embodiments in which the application order is columns followed by rows.

Initially, a 1D inverse transform is applied 2000 to the rows of the TU. The bit widths of the intermediate results from the application of this 1D inverse transform are then reduced 2002 according to the scaling factor and the set of clip bit widths. More specifically, the scaling factor is first applied to each intermediate result to reduce the bit width of each intermediate result to the same fixed bit width, e.g., 12. Then, each scaled intermediate result is clipped according to the corresponding clip bit width in the set of clip bit widths. As was previously discussed, the final bit widths of the intermediate results may be varying sizes as the clip bit widths in the set of clip bit widths may vary.

The reduced bit width intermediate results are stored 2004 in the transpose buffer. A 1D inverse transform is then applied 2006 to the columns of the intermediate results stored in the transpose buffer to generate a block of residual values. The bit widths of the residual values are reduced 2008 to the desired residual bit width, e.g., by scaling and clipping.

Figure 21:
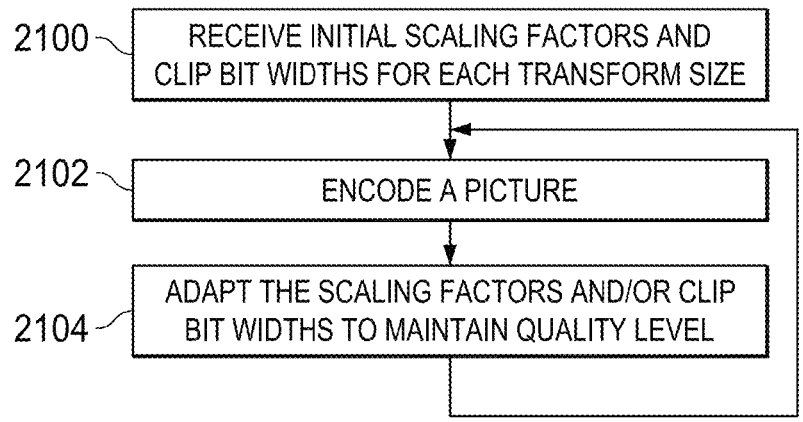
FIG. 21 is a flow diagram of a method for adapting scaling factors and clip bit widths.

FIG. 21 is a flow diagram of a method for adapting scaling factors and/or clip bit widths to maintain an expected quality level that may be performed in an encoder. The method assumes that an expected distortion percentage is provided. The scaling factors and/or clip bit widths are adapted as needed after each picture is encoded to maintain the specified distortion percentage.

The initial scaling factors and associated clip bit widths for each transform size that may be used in encoding are received 2100. The initial scaling factors and associated clip bit widths may be predetermined empirically using techniques described herein. A picture of the video of the video sequence is then encoded 2102. Transforms are applied to residual blocks during the encoding using the appropriate scaling factors and associate bit widths to generate coefficient blocks that are then entropy encoded. During the encoding of the picture, the variance of the residuals of applying the largest defined transform size, e.g., 32×32, is accumulated. That is, each time the largest transform size is applied to a block of residual values to generate the coefficients to be entropy encoded, the variance of the residuals is determined, and these variances are accumulated, i.e., summed, to provide a variance of the residuals for the picture.

The scaling factors and/or clip bit widths may then be adapted 2104 as needed to maintain the expected quality level as indicated by the distortion percentage, and the adapted values used for encoding the next picture. More specifically, a clip bit width for each intermediate result of the largest transform can be found as per the following equation:

$$\text{Clip\_bit\_width} = 1/\text{sqrt}(2) \times \ln(\% \text{ distortion}) \times \sigma_c$$

where ln is the natural logarithm and $\sigma_c$ is the standard deviation of the intermediate results. The value of $\sigma_c$ can be determined from the standard deviation of the residuals computed for the picture. In general, $\sigma_c = \text{constant} \times \sigma\_\text{residual}$, where the constant is empirically determined. For this determination, it is assumed that the values of the intermediate results have a Laplacian distribution. The closest power of 2 to the Clip_bit_width is used for the clip bit width of the intermediate result c.

In some embodiments, the clip bit width for a given intermediate result and the shift, i.e., fB, of the scaling factor are assumed to be a single parameter. Their relationship is expressed as follows:

$$\text{Clip\_bit\_width} = 1/\text{sqrt}(2) \times \ln(\% \text{ distortion}) \times (\sigma_c / 2^{(fB)}).$$

Thus, if the shift value is increased by 1, the distortion percentage is maintained by scaling the clip bit width by 2. Thus, the two values are correlated and an adaptation can affect both or the shift value fB can be kept fixed and the clip bit width adapted.

A table such as Table 3 may be used to choose an initial value for fB and iB for an encoder based on the transpose buffer size and to adapt these values during encoding to manage the quality of the compressed output. For example, assume that the transpose buffer size is such that it can hold intermediate results with a bit width of 6 for a 32×32 transform. Note that the transpose buffer is typically sized to hold the largest possible set of intermediate results, which would be for a 32×32 transform in Table 3. However, for quality reasons, rather than scaling each intermediate result to 6 bits, the intermediate results may be scaled to a larger bit width, e.g., 12 and then clipped to variable bit widths to ensure that all of the interim results fit into the transpose buffer. In this scenario, the value of fB would be 4 and the value of iB would be 3. The clip bit widths may be determined based on distortion as previously described herein.

Figure 22:
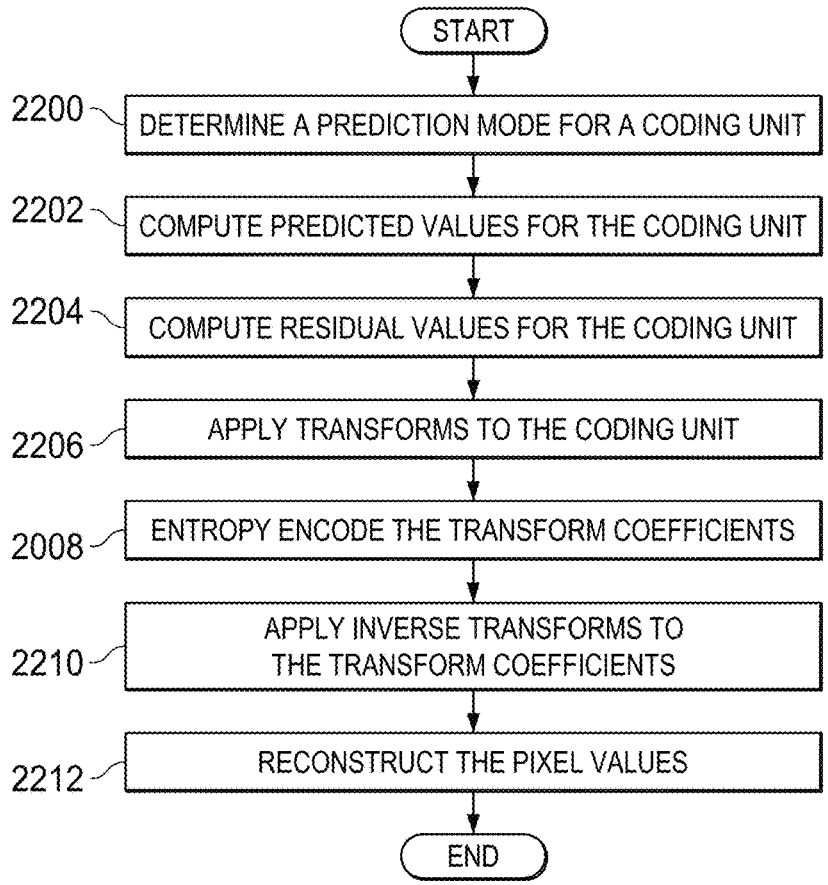
FIG. 22 is a flow diagram of an encoding method.

FIG. 22 is a flow diagram of a method for encoding a coding unit of a picture in a video sequence. Initially, a prediction mode, e.g., inter-prediction or intra-prediction, is determined 2200 for the coding unit. As part of determining the prediction mode, rate-distortion costs for various transform unit sizes may be computed. A method for computing rate-distortion costs for a transform unit that may be used in some embodiments is described above in reference to FIG. 18. The scaling factor and a set of clip bit widths for the transform computation may be predetermined or may be adapted from an initial scaling factor and set of clip widths specified for the transform unit size. The pre-determined values of the scaling factor and set of clip bit widths may be determined empirically using techniques described herein. The adaptation of a scaling factor and associated set of clip bit widths may be performed during the encoding process using techniques described herein.

Predicted values for the coding unit are computed 2202 as per the selected prediction mode, and residual values for the coding unit are then computed 2204 using the predicted values. One or more transforms are then applied 2206 to the residual values of the coding unit to generate transform coefficients. A method for applying a transform to a transform unit of residual values that may be used in some embodiments is described above in reference to FIG. 19. The scaling factor and a set of clip bit widths for the transform computation may be predetermined or may be adapted from an initial scaling factor and set of clip widths specified for the transform unit size. The pre-determined values of the scaling factor and set of clip bit widths may be determined empirically using techniques described herein. The adaptation of a scaling factor and associated set of clip bit widths may be performed during the encoding process using techniques described herein. In some embodiments in which rate-distortion costs for TUs are computed as per the method of FIG. 18 and transforms are applied to TUs of residual values as per the method of FIG. 19, the scaling factor and set of clip bit widths for a given transform size may be different for the rate-distortion cost computation and the application of a transform of that size to residual values.

The transform coefficients are then entropy encoded 2208 into the compressed bit stream. As is well known, the coefficients are quantized prior to entropy encoding. One or more inverse transforms (the inverse of the transform or transforms applied to generate the transform coefficients) are applied to the transform coefficients to recover the residual values of the CU. A method for applying an inverse transform to a transform unit of transform coefficients that may be used in some embodiments is described above in reference to FIG. 20. The scaling factor and a set of clip bit widths for the transform computation may be predetermined or may be adapted from an initial scaling factor and set of clip widths specified for the transform unit size. The pre-determined values of the scaling factor and set of clip bit widths may be determined empirically using techniques described herein. The adaptation of a scaling factor and associated set of clip bit widths may be performed during the encoding process using techniques described herein. The pixel values of the CU are then reconstructed 2212. In-loop filters are applied to the pixel values and the filtered pixel values are stored for use as reference data.

Figure 23:
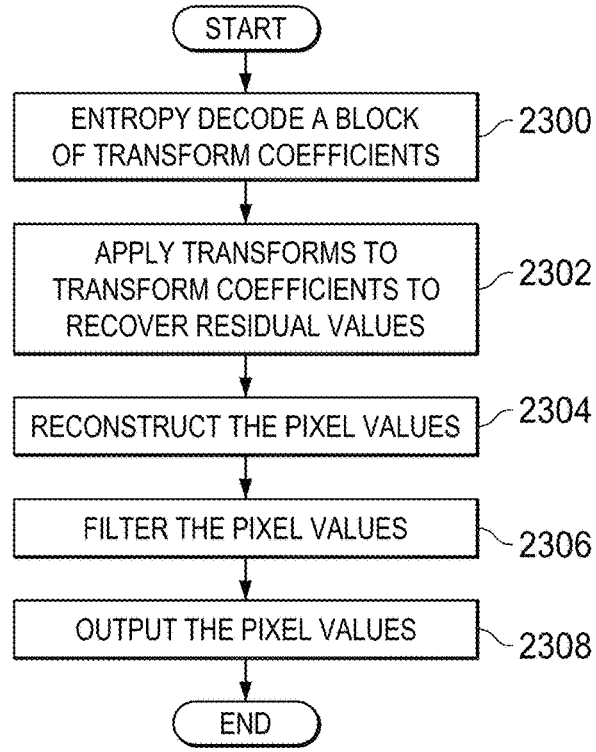
FIG. 23 is a flow diagram of a decoding method.

FIG. 23 is a flow diagram of a method for decoding a coding unit of a picture from an encoded video bit stream. Initially, a block of transform coefficients corresponding to the CU is entropy decoded 2300 from the encoded bit stream. One or more inverse transforms are then applied 2302 to the block of transform coefficients to recover the residual values of the CU. A method for applying an inverse transform to a transform unit of transform coefficients that may be used in some embodiments is described above in reference to FIG. 20. The scaling factor and a set of clip bit widths for the inverse transform computation may be pre-determined. The predetermined values of the scaling factor and set of clip bit widths may be determined empirically using techniques described herein. As is well known, the block of transform coefficients is de-quantized prior to applying the one or more inverse transforms.

The pixels values of the CU are then reconstructed 2304 from the recovered residual values according to the recovered residual values and predicted values generated according to a prediction mode signaled in the compressed bit stream. The pixel values are then filtered 2306 and output 2308 as part of the decoded video sequence.

Figure 24:
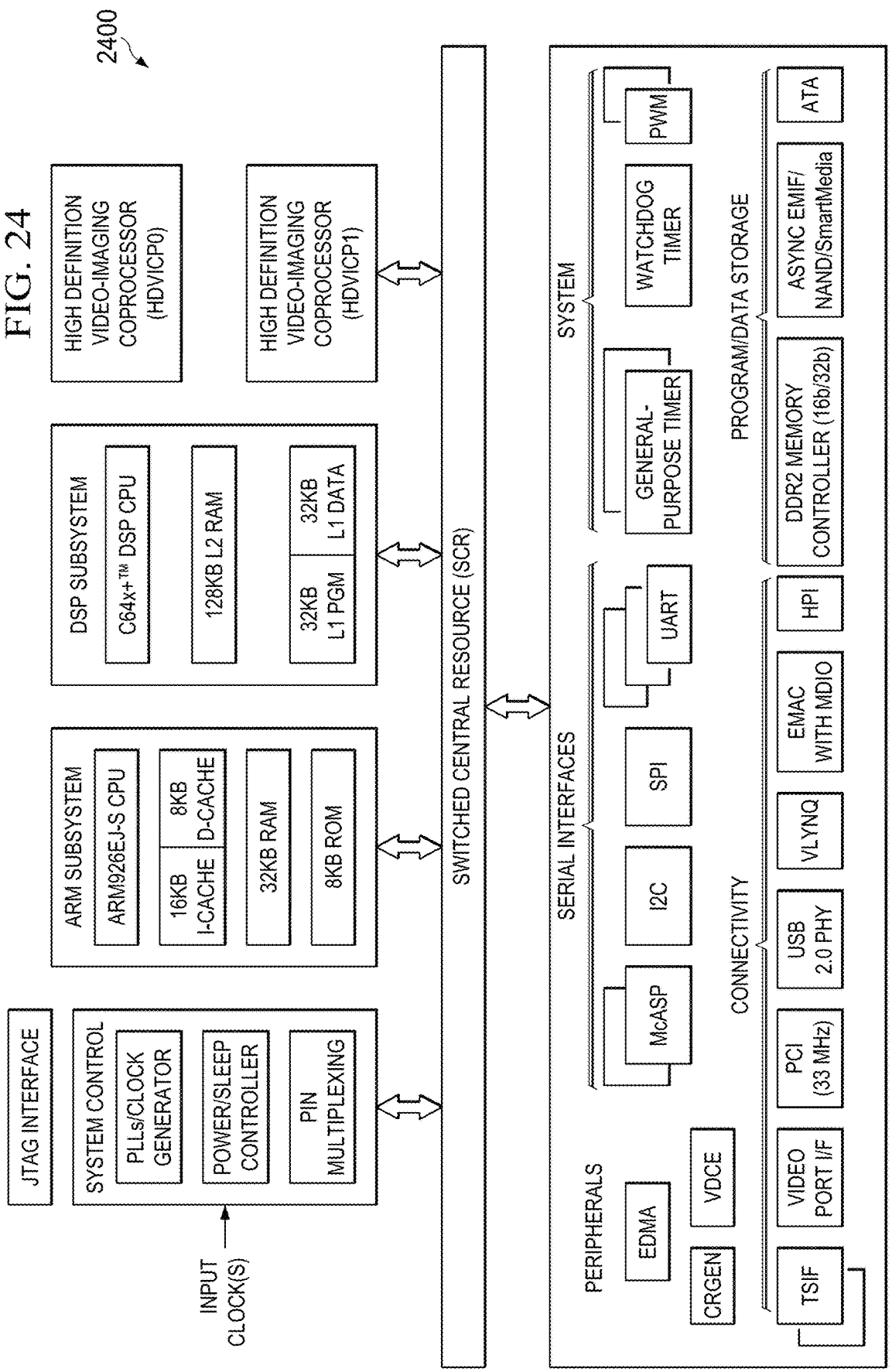
FIG. 24 is a block diagram of an illustrative digital system.

FIG. 24 is a block diagram of an example digital system suitable for use as an embedded system that may be configured to perform transform computations with variable bit width intermediate results as described herein during encoding of a video stream and/or during decoding of an encoded video bit stream. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 2400 is a programmable platform designed to meet the processing needs of applications such as video encode/decode/transcode/transrate, video surveillance, video conferencing, set-top box, medical imaging, media server, gaming, digital signage, etc. The SoC 2400 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 2400 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+TM core with a very-long-instruction-word (VLIW) architecture. In general, the ARM is responsible for configuration and control of the SoC 2400, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 2400 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 24, the SoC 2400 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding such as motion estimation, motion compensation, intra-prediction, transformation, and quantization. Further, the distinct circuitry in the HDVICP coprocessors that may be used for specific computation operations is designed to operate in a pipeline fashion under the control of the ARM subsystem and/or the DSP subsystem.

As was previously mentioned, the SoC 2400 may be configured to perform transform computations with variable bit width intermediate results as described herein during encoding of a video stream and/or during decoding of an encoded video bit stream using methods described herein. For example, the coding control of the video encoder of FIG. 4 may be executed on the DSP subsystem or the ARM subsystem and at least some of the computational operations of the block processing, including the intra-prediction and inter-prediction of mode selection with rate distortion cost computation, transformation, quantization, and entropy encoding may be executed on the HDVICP coprocessors. At least some of the computational operations of computing transforms with variable bit width intermediate results performed during encoding of a video stream may also be executed on the HDVICP coprocessors. Similarly, at least some of the computational operations of the various components of the video decoder of FIG. 5, including entropy decoding, inverse quantization, inverse transformation, intra-prediction, and motion compensation may be executed on the HDVICP coprocessors. Further, at least some of the computational operations of computing inverse transforms with variable bit width intermediate results performed during decoding of an encoded video bit stream may also be executed on the HDVICP coprocessors.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, while embodiments may have been described herein in which transform computations with variable bit width intermediate results are performed for rate-distortion cost computation, transformation of residual values, and inverse transformation of coefficient values, one of ordinary skill in the art will understand embodiments in which transformation computations with variable bit width intermediate results are not performed for all three cases. For example, one of ordinary skill in the art will understand embodiments in which a different transform computation is used for the rate distortion cost computation in encoding while transformation computations with variable bit width intermediate results are performed for the transformation of residual value and the inverse transformation of coefficient values in the encoder.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

The invention claimed is:

1. A method comprising:
 entropy decoding a block of transform coefficients from an encoded video bit stream;
 applying a first one-dimensional (1D) inverse transform of a two-dimensional (2D) separable inverse transform to the block of transform coefficients;
 reducing a bit width of each intermediate result of applying the first 1D inverse transform, wherein the reduced bit width of a first intermediate result and the reduced bit width of a second intermediate result are different, wherein reducing the bit width comprises scaling the bit width of each intermediate result based on a predetermined shift amount; and clipping the scaled bit width of each intermediate result to a predetermined bit width to attain a final bit width, wherein the final bit width for a first scaled intermediate result is different from the final bit width for a second scaled intermediate result;
 storing the reduced bit width intermediate results in a transpose buffer; and
 applying a second 1D inverse transform of the 2D separable inverse transform to the reduced bit width intermediate results to recover a block of residual values.

2. The method of claim 1, wherein the predetermined shift amount is different from a predetermined shift amount used to generate the transform coefficients in an encoder.

3. The method of claim 1, wherein the predetermined shift amount and the predetermined bit width for each scaled intermediate result were predetermined based on a size of the transpose buffer.

4. A method comprising:
 applying a first one-dimensional (1D) transform of a two-dimensional (2D) separable transform to a block of residual values;
 reducing a bit width of each intermediate result of applying the first 1D transform, wherein the reduced bit width of a first intermediate result and the reduced bit width of a second intermediate result are different, wherein reducing the bit width comprises scaling the bit width of each intermediate result based on a predetermined shift amount; and clipping the scaled bit width of each intermediate result to a predetermined bit width to attain a final bit width, wherein the final bit width for a first scaled intermediate result is different from the final bit width for a second scaled intermediate result;

storing the reduced bit width intermediate results in a transpose buffer;

applying a second 1D transform of the 2D separable transform to the reduced bit width intermediate results to generate a block of transform coefficients; and entropy encoding the block of transform coefficients into an encoded video bit stream.

5. The method of claim 4, wherein the shift amount is different from a predetermined shift amount used to decode the transform coefficients in a decoder.

6. The method of claim 4, wherein the shift amount and a clip bit width for each scaled bit width were predetermined based on a size of the transpose buffer.

7. The method of claim 6, further comprising adapting at least one selected from a group consisting of the shift amount and the clip bit widths of the scaled intermediate results to manage quality of encoded video data, wherein the adapting is based on the size of the transpose buffer.

8. The method of claim 4, further comprising;

computing a rate distortion cost for a coding block of a picture of the video sequence, wherein computing the rate distortion cost comprises:

applying a third 1D transform of a second 2D separable transform to a block of residual values of the coding block;

reducing a bit width of each intermediate result of applying the third 1D transform, wherein the reduced bit width of a third intermediate result and the reduced bit width of a fourth intermediate result are different;

storing the reduced bit width intermediate results of applying the third 1D transform in a second transpose buffer;

applying a second 1D transform of the second 2D separable transform to the reduced bit width intermediate results stored in the second transpose buffer to generate a second block of transform coefficients; and computing a rate distortion cost using the second block of transform coefficients.

9. The method of claim 8 wherein reducing a bit width of each intermediate result of applying the third 1D transform comprises:

scaling the bit width of each intermediate result of applying the third 1D transform based on a second shift amount, wherein a same second shift amount is applied to each intermediate result; and clipping the scaled bit width of each intermediate result of applying the third 1D transform to a final bit width, wherein the final bit width for a first scaled intermediate result of applying the third 1D transform is different from the final bit width for a second scaled intermediate result of applying the third 1D transform.

10. The method of claim 9, wherein the second shift amount is different from a shift amount used when the third 1D transform is used to generate transform coefficients for entropy encoding.

11. The method of claim 9, wherein the second shift amount and a clip bit width of each scaled bit width of each intermediate result of applying the third 1D transform were predetermined based on a size of the transpose buffer.

12. The method of claim 11, further comprising adapting at least one selected from a group consisting of the second shift amount and the clip bit widths of the scaled intermediate results of applying the third 1D transform to manage quality of encoded video data, wherein the adapting is based on a size of the second transpose buffer.

13. A method comprising:

computing a rate distortion cost for a coding block of a picture of a video sequence, wherein computing the rate distortion cost comprises:

applying a first one-dimensional (1D) transform of a two-dimensional (2D) separable transform to a first block of residual values;

reducing a bit width of each intermediate result of applying the first 1D transform, wherein the reduced bit width of a first intermediate result and the reduced bit width of a second intermediate result are different, wherein reducing the bit width comprises scaling the bit width of each intermediate result based on a predetermined shift amount; and clipping the scaled bit width of each intermediate result to a predetermined bit width to attain a final bit width, wherein the final bit width for a first scaled intermediate result is different from the final bit width for a second scaled intermediate result;

storing the reduced bit width intermediate results in a first transpose buffer;

applying a second 1D transform of the 2D separable transform to the reduced bit width intermediate results to generate a first block of transform coefficients; and computing a rate distortion cost using the first block of transform coefficients;

using the rate distortion cost for the coding block to select a prediction mode for the coding block;

generating a second block of residual values for the coding block according to the prediction mode;

computing a second block of transform coefficients for the second block of residual values; and entropy encoding the second block of transform coefficients into an encoded video bit stream.

14. The method of claim 13, further comprising adapting at least one selected from a group consisting of the shift amount and the clip bit widths of the scaled intermediate results to manage quality of the encoded video data, wherein the adapting is based on a size of the transpose buffer.

15. The method of claim 13, wherein computing a second block of transform coefficients comprises:

applying a third 1D transform of a second 2D separable transform to the second block of residual values;

reducing a bit width of each intermediate result of applying the third 1D transform, where the reduced bit width of a third intermediate result and the reduced bit width of a fourth intermediate result are different;

storing the reduced bit width intermediate results of applying the third 1D transform in a second transpose buffer; and applying a second 1D transform of the second 2D separable transform to the reduced bit width intermediate results stored in the second transpose buffer to generate the second block of transform coefficients.

16. The method of claim 15 wherein reducing a bit width of each intermediate result of applying the third 1D transform comprises:

scaling the bit width of each intermediate result of applying the third 1D transform based on a second shift amount, wherein a same second shift amount is applied to each intermediate result; and clipping the scaled bit width of each intermediate result of applying the third 1D transform to a final bit width, wherein the final bit width for a first scaled intermediate result of applying the third 1D transform is different from the final bit width for a second scaled intermediate result of applying the third 1D transform.

17. The method of claim 16, further comprising adapting at least one selected from a group consisting of the second shift amount and the clip bit widths for the scaled intermediate results of applying the third 1D transform to manage quality of encoded video data, wherein the adapting is based on a size of the second transpose buffer.

\* \* \* \* \*